US008602649B2

(12) United States Patent
Schmal et al.

(10) Patent No.: US 8,602,649 B2
(45) Date of Patent: Dec. 10, 2013

(54) LINER WITH ELASTIC SECURING MECHANISM

(75) Inventors: Michael D. Schmal, Orwigsburg, PA (US); Ernest E. Bachert, Orwigsburg, PA (US); Joseph A. Radosta, Easton, PA (US)

(73) Assignee: M&Q IP Leasing, Inc., Wilmington, DE (US)

( * ) Notice: Subject to any disclaimer, the term of this patent is extended or adjusted under 35 U.S.C. 154(b) by 491 days.

(21) Appl. No.: 12/859,963

(22) Filed: Aug. 20, 2010

(65) Prior Publication Data

US 2012/0045153 A1 Feb. 23, 2012

(51) Int. Cl.
*B65D 33/28* (2006.01)

(52) U.S. Cl.
USPC ............. 383/75; 383/118; 383/71; 220/573.4

(58) Field of Classification Search
USPC ...................... 383/118, 71–76; 219/429, 432; 220/573.4, 573.5, 495.03, 908–911
See application file for complete search history.

(56) References Cited

U.S. PATENT DOCUMENTS

| | | | | |
|---|---|---|---|---|
| 3,047,188 | A * | 7/1962 | Durbin | 220/495.11 |
| 4,642,819 | A * | 2/1987 | Ales et al. | 2/400 |
| 4,828,134 | A * | 5/1989 | Ferlanti | 220/573.1 |
| 5,120,138 | A * | 6/1992 | Midgley et al. | 383/7 |
| 6,059,458 | A * | 5/2000 | Belias et al. | 383/75 |
| 6,164,824 | A * | 12/2000 | McGlew et al. | 383/75 |
| 6,313,446 | B1 * | 11/2001 | Jones | 219/433 |
| 6,402,377 | B1 * | 6/2002 | Vo et al. | 383/75 |
| 6,457,601 | B1 * | 10/2002 | Chappell | 220/573.4 |
| 6,706,303 | B2 * | 3/2004 | Fawson | 426/523 |
| 6,994,469 | B2 * | 2/2006 | Sleight et al. | 383/43 |
| 7,112,764 | B2 * | 9/2006 | Garcia | 219/429 |
| 7,163,120 | B1 * | 1/2007 | Blucher | 220/573.4 |
| 7,942,577 | B2 * | 5/2011 | Fraser et al. | 383/72 |
| 2002/0079316 | A1 * | 6/2002 | Greenfield et al. | 220/573.4 |
| 2003/0142887 | A1 * | 7/2003 | Sleight et al. | 383/7 |
| 2004/0202388 | A1 * | 10/2004 | Rusnak et al. | 383/71 |
| 2005/0207681 | A1 * | 9/2005 | Raterman | 383/75 |
| 2006/0009339 | A1 * | 1/2006 | Sleight et al. | 493/215 |
| 2006/0266753 | A1 * | 11/2006 | Valles | 220/495.11 |
| 2007/0036472 | A1 * | 2/2007 | Persenda | 383/33 |
| 2008/0137995 | A1 * | 6/2008 | Fraser et al. | 383/75 |
| 2008/0245466 | A1 * | 10/2008 | Schmal et al. | 156/73.1 |
| 2008/0247683 | A1 * | 10/2008 | Schmal et al. | 383/104 |
| 2009/0080812 | A1 * | 3/2009 | Schmal et al. | 383/109 |

(Continued)

*Primary Examiner* — Nathan J Newhouse
*Assistant Examiner* — Peter Helvey
(74) *Attorney, Agent, or Firm* — Pepper Hamilton LLP

(57) ABSTRACT

An improved liner having an elastic securing mechanism that may be placed in a vessel to form and maintain a barrier between the vessel and objects contained therein. The liner includes an elastic securing band secured around the perimeter of the open top end of the liner using a plurality of spaced-apart tack welds or rivets. In one embodiment, the liner material is folded over the elastic and ultrasonic sealing is used to burn through the elastic and seal the folded liner material to itself thereby securing the elastic to the liner. In use, the liner is placed within a receptacle of the vessel and the open top end is folded outward and downward over a rim of the vessel such that the elastic engages an outside of the vessel to form a secure and snug fit of the liner to the vessel. Advantageously, a failure to a portion of the elastic is limited to that portion of the elastic only and propagation of the failure is limited by the rivets.

16 Claims, 15 Drawing Sheets

(56) References Cited

U.S. PATENT DOCUMENTS

| | | | | |
|---|---|---|---|---|
| 2009/0081417 | A1* | 3/2009 | Schmal et al. | 428/192 |
| 2010/0163564 | A1* | 7/2010 | Schmal et al. | 220/573.4 |
| 2010/0247002 | A1* | 9/2010 | Ross | 383/75 |
| 2010/0303388 | A1* | 12/2010 | Kent et al. | 383/32 |
| 2011/0064333 | A1* | 3/2011 | Ross | 383/75 |
| 2011/0075952 | A1* | 3/2011 | Mallory | 383/75 |
| 2011/0229061 | A1* | 9/2011 | Bertrand et al. | 383/75 |
| 2013/0051708 | A1* | 2/2013 | Cobler | 383/75 |

* cited by examiner

LINER WITH ELASTIC SECURING MECHANISM

TECHNOLOGY FIELD

The present invention relates in general to liners, and more particularly, to a liner having an improved elastic securing band for holding the liner in place within a receptacle to form a barrier between objects placed within the liner and the interior surfaces the receptacle. Embodiments of the present invention are particularly well suited, but in no way limited, to food cooking applications.

BACKGROUND

Slow cookers provide a simple cooking method for cooking particular dishes, including stews, pot roasts, chili, soups, and the like. One popular type of slow cooker is known as a crock pot. Although slow cookers cook these types of dishes in a desirable fashion, the ceramic cooking pot of the slow cooker can often become encrusted with burned on food residue which is difficult to clean. Accordingly, disposable liners may be placed inside the container of the slow cooker to cover the interior surfaces of the slow cooker thereby keeping the food separate from the surfaces of the slow cooker. These liners may include bag-shaped liners having a tubular body sealed at a bottom end and at the sides, and having an opening at a top end. When a user is finished with the slow cooker, the disposable liners can be removed and discarded, leaving little or no clean up.

The known liners for slow cookers, however, have certain shortcomings. For example, when the liners are placed in the slow cooker, excess material near the top or open end of the liner loosely folds over the rim of the slow cooker. This excess and loose liner material may interfere with cooking. Things, such as cooking utensils, may get caught on the excess and loose part of the liner, may catch and pull on the liner, etc. Also, the excess and loose part at the top of the line gives a sloppy appearance to the presentation and hence may be aesthetically displeasing to the user. Also, the liner may fall into the slow cooker, for example during loading, stirring and/or serving. Furthermore, loose liners tend to settle down into the contents of the slow cooker, creating a mess.

It is known to provide a rubber band to hold a looser fitting liner in place. However, rubber bands suffer a fatal failure problem in that a tear in the rubber band will cause the liner to fall into the cooking vessel. Any failure in the rubber band causes a complete failure of the rubber band resulting in a loose and unsecure liner. In addition, rubber bands are not approved for food service applications and also are not suitable for high temperature applications. Further, the rubber band is separate from the liner adding an extra part for manufacturing, inventory, display, sales, etc. purposes. Moreover, the rubber band application typically requires two people to implement—i.e., one to hold the liner in place and another to stretch and place the rubber band over the top opening of the slow cooker and the liner.

It is also known to provide elastic proximate the top opening of the liner bag in order to secure the liner in place and to reduce the likelihood of the liner falling back into the slow cooker. For example, U.S. patent application Ser. No. 12/160,623, entitled Slow Cooker Liner With Securing Band discloses a slow cooker liner with an elastic securing band. The liner system disclosed in U.S. patent application Ser. No. 12/160,623 comprises a securing band that is not adhered to the liner along its length, but that is adhered to the liner at its ends. One problem with this design is that a tear or other failure in the elastic may cause the entire elastic band to fail.

What is needed is a liner having an elastic band design that reduces and/or prevents failure of the entire elastic band in the event of a tear in a portion of the elastic. What is also needed is a liner with an elastic band that provides a more aesthetically pleasing appearance of the liner and the cooking vessel. In addition, what is needed is an elastic band that is encapsulated or built into the liner to hold the liner in place and prevent it from falling back into the cooking vessel. Further, what is needed is a liner having an elastic band that is safe for and approved for food service application. What is needed is a liner having a built-in elastic band that is suitable for high temperature applications.

SUMMARY

Embodiments of the present invention address and overcome one or more of the above shortcomings and drawbacks, by providing devices, systems, and methods for safely and efficiently securing a liner to a vessel to cover an interior surface of the vessel and to act as a barrier between the interior surface of the vessel and objects placed within the vessel. This technology is particularly well-suited for, but by no means limited to, food service applications including for example, slow cooker liners. The elastic band according to embodiment of the present invention provides an improvement over prior designs in that the tack weld or rivet design reduces and/or substantially prevents complete failure of the elastic in the event of a break or other failure in any portion of the elastic band.

According to one embodiment of the invention, a liner having an elastic securing band disposed around a perimeter of the liner proximate the open top end of the liner body. A plurality of spaced-apart rivets are used to secure the elastic securing band to the liner. In some embodiments, the liner includes a bag-like shaped liner body. The bag-like shaped liner body includes a closed bottom end, one or more side walls extending upwardly from the closed bottom end, and an open top end.

According to one aspect of the invention, the liner having an elastic securing band secured using a plurality of spaced apart rivets may be used to cover the interior surface of a vessel, such as a cooking vessel.

In some embodiments of the invention, the melting point of the liner is the same or higher than the melting point of the elastic securing band. In other embodiments of the invention, the melting point of the liner is higher than the melting point of the elastic securing band.

According to another aspect of the invention, the liner having an elastic securing band secured using a plurality of spaced apart rivets may further include a cuff formed proximate the open top end of the liner. The elastic securing band may be positioned within the cuff. In some embodiments, the cuff may be formed by folding the liner material over the elastic. Opposite sides of the liner forming the cuff may be welded together to form the rivets through holes in the elastic securing band. According to one aspect of the invention, the opposite sides of the liner may be welded together using ultrasonic sealing techniques. According to yet another aspect of the invention, a cuff seal may be formed at the lower end of the cuff. In some embodiments, the cuff seal does not engage the elastic securing band. In some embodiments, the cuff seal includes a continuous seal to encapsulate the elastic securing band in the cuff.

According to another aspect of the invention, the liner having an elastic securing band secured using a plurality of spaced apart rivets may further include spaces between adjacent rivets, wherein the elastic securing band is not connected to the liner in the area of the spaces.

In some embodiments, the rivets are formed in a center portion of the elastic securing band and the rivets do not extend to edge portions of the elastic securing band. In such embodiments, the edge portions of the elastic securing band are not connected to the liner. In some embodiments, the rivets have rounded corners. In some embodiments, the rivets are slanted and formed at an angle to an imaginary line extending transversely between opposite edges of the elastic securing band.

The liner material may comprise one of: a nylon; a polyester; a polyester elastomer; a polyamide elastomer; or a polyolefin. The elastic securing band material may comprise one of: a polyester elastomer; a polyamide elastomer; or a polyolefin elastomer. In one embodiment, the liner material comprises a blend of about 60% nylon 6 and about 40% heat stabilized nylon 66; and the elastic securing band material comprises a polyester elastomer with a Shore D hardness of about 25-40.

According to one aspect of the invention, the liner and riveted elastic securing band can withstand cooking applications between about 100 degree F. and about 400 degree F. According to other aspects of the invention, the liner having a riveted elastic securing band is suitable for high temperature applications over about 400 degree F.

According to another embodiment of the invention, a bag-shaped liner having an elastic securing band riveted to the liner is used to cover the interior surface of a vessel. In one embodiment, the bag-shaped liner includes a closed bottom end, an open top end, and one or more side walls extending upwardly from the closed bottom end to the open top end. The elastic securing band is disposed around a perimeter of the liner proximate the open top end. A cuff is formed proximate the open top end of the liner, wherein the elastic securing band is positioned within the cuff. A plurality of spaced-apart rivets secure the elastic securing band to the liner. The melting point of the liner is higher than the melting point of the elastic securing band, such that opposite sides of the cuff are welded together to form the plurality of spaced-apart rivets through holes in the elastic securing band. Spaces are provided between adjacent rivets, meaning the elastic securing band is not connected to the liner in the spaces between adjacent rivets, the rivets are formed in a center portion of the elastic securing band, meaning the rivets do not extend to edge portions of the elastic securing band, and the edge portions of the elastic securing band are not connected to the liner. Also, the rivets may be formed at an angle to an imaginary line extending transversely between opposite edges of the elastic securing band.

According to another embodiment of the invention, a method of forming a liner having an elastic securing band proximate a open top end of the liner for securing the liner to a vessel is provided. The method includes the steps of: providing a liner; applying the elastic to the edges of the liner; forming cuffs of liner material proximate the liner edges, wherein the elastic is positioned within the cuff; and securing the elastic to the liner using a plurality of spaced-apart rivets.

The step of securing the elastic securing band to the liner may further comprise ultrasonically welding the securing band to the liner. The step of ultrasonically welding may include: burning a hole through the elastic; and welding the liner material on one side of the cuff to the liner material on the other side of the cuff through the hole in the elastic to form the rivet.

The step of forming the cuff of liner material may further comprise folding the edge of the liner over onto a top portion of the liner and over the elastic. A cuff seal may be formed to encapsulate the elastic in the cuff. The cuff seal may be formed using heating sealing techniques.

The method may further include forming a bag-shaped body by folding the liner in half to form a closed bottom end and an open top end. The cuffs and elastic may be positioned at the open top end.

The method may further include pre-stretching the elastic as it is being applied to the liner. The method may further include forming a side edge seal of the bag-shaped body using heat sealing techniques; and partially relaxing the pre-stretch on the elastic as the side edge seal is being formed. In some embodiments, the method may include forming two side edge seals simultaneously using heat sealing techniques, wherein one of the simultaneously formed side edge seals is a trailing edge of a leading bag-shaped liner and the other of the simultaneously formed side edge seals is a leading edge of a trailing bag-shaped liner; and partially relaxing the pre-stretch on the elastic on both sides of the simultaneously formed side edge seals.

In some embodiments, the method may include continuously forming bag-shaped liners by: continuously feeding the liner off a spool of liner material; continuously feeding the elastic securing band off a spool of elastic material and continuously applying the elastic to the liner, and continuously forming bag-shaped liners having an elastic securing band.

Additional features and advantages of the invention will be made apparent from the following detailed description of illustrative embodiments that proceeds with reference to the accompanying drawings.

BRIEF DESCRIPTION OF THE DRAWINGS

The foregoing and other aspects of the present invention are best understood from the following detailed description when read in connection with the accompanying drawings. For the purpose of illustrating the invention, there is shown in the drawings embodiments that are presently preferred, it being understood, however, that the invention is not limited to the specific instrumentalities disclosed. Included in the drawings are the following Figures.

DETAILED DESCRIPTION OF ILLUSTRATIVE EMBODIMENTS

Figure 1:
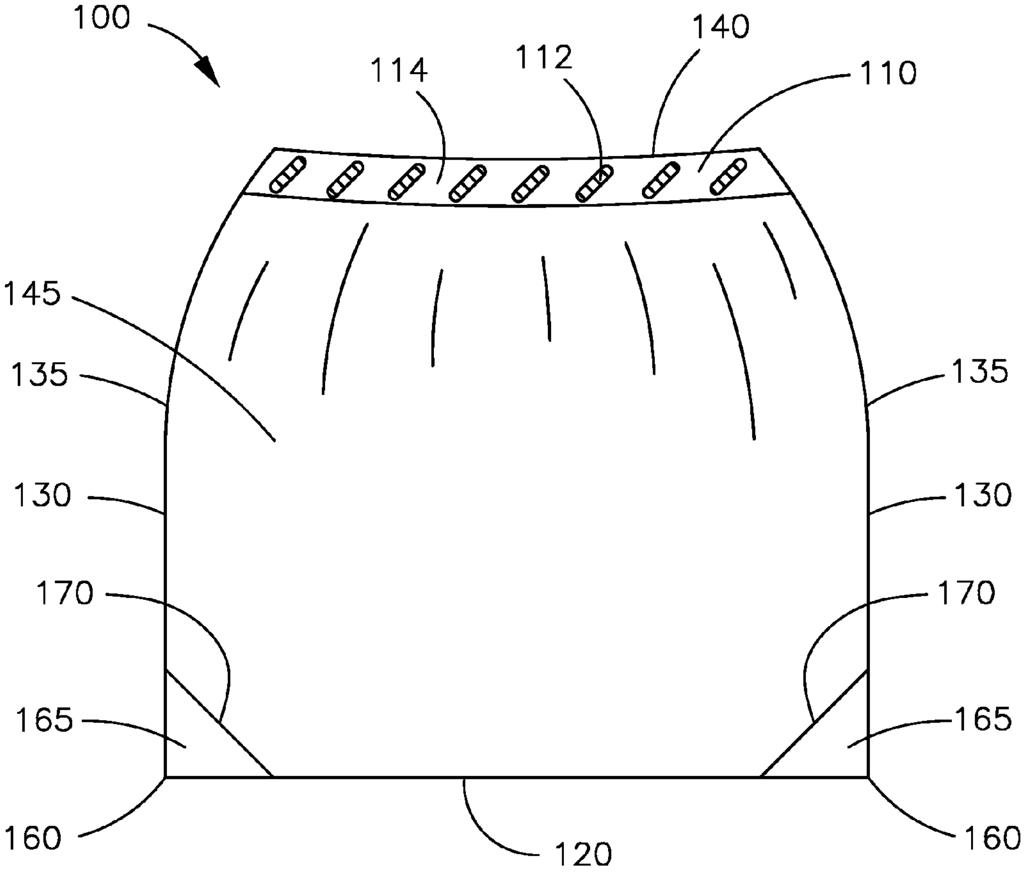
FIG. 1 shows an embodiment of an exemplary liner having an elastic securing band attached to the liner using a rivet design.

The above problems in the prior art have motivated the creation of a liner having an integral elastic band that reduces and/or substantially eliminates complete failure of the elastic band that may result from a tear or failure in a portion of the elastic. In some embodiments, the elastic band is attached to the liner using a plurality of spaced-apart tack welds or rivets (hereinafter rivets). These rivets isolate any failure of the elastic to only that portion of the elastic between adjacent rivets thereby preventing propagation of the failure or zippering of the elastic. The improved coupling of the elastic band to the liner reduces and/or prevents complete failure of the elastic thus preventing the liner from sliding down in to the receptacle of a container or vessel (hereinafter vessel), for example, a cooking vessel. This helps ensure a more aesthetically pleasing appearance to the whole cooking vessel/liner set-up. In some embodiments, the improved liner includes an encapsulated elastic band that is connected to the liner in a manner that reduces and/or substantially eliminates complete failure of the elastic band that may result from a failure (e.g., a tear, rip, nick, hole, etc.) in a portion of the elastic.

Embodiments of the present invention provide a breakthrough in that it was discovered that an ultrasonic sealer may be used that comprises a wheel having a series of spaced-apart, raised protrusions. When the elastic material is positioned into an upper cuff of the liner and subjected to the ultrasonic sealer, the liner material melts and a through hole is burnt in the elastic material and then the liner material on one side of the cuff tap welds to the liner material on the other side of the cuff. This process creates, essentially, a rivet connecting the liner material on one side of the cuff to the liner material on the other side of the cuff through a hole in the elastic band. As such, the elastomer material isn't being sealed to the liner material, but rather the liner material is sealing to itself through a hole that is burned through the elastic during the ultrasonic sealing technique.

This technique provides a real breakthrough in the art. It is believed that this technique and knowledge is not known to people in the heat sealing industry, including the ultrasonic sealing industry. It is something that the inventors of the present invention stumbled upon and then perfected through trial and error.

Since this technique basically creates a hole through the elastic, it teaches away from convention techniques for ultrasonic and heat sealing. For example, it is known in the art that when one puts a nick or a hole in an elastic, the elastic will have a tendency to tear. And tears in the elastic have a tendency to propagate (i.e., zippering) when the elastic is stretched. Embodiments of the present invention provide raised protrusions on an ultrasonic sealing wheel to form rivets sealing the liner material to itself though a hole in the elastic. The raised protrusion may include a variety of shapes, may be angled, may include rounded or beveled edges, rounded corners, etc. for improved performance of the liner having an elastic securing band. For example, the design and construction (e.g., shape, orientation, rounded edges, etc.) of the raised protrusions may provide embodiments that are less prone to tearing the elastic, because in some embodiments the elastic is applied in a state of tension—i.e., the elastic is actually stretched while it is being applied to the liner. So that when the elastic is welded into the cuff, the elastic then relaxes and collapses the top opening of the liner bag (see e.g., FIG. 1). When the elastic is in a relaxed state, the liner top opening may have a scrunched appearance.

Another variable that may be varied to affect the performance and characteristics of the elastic and liner is the spacing or intervals between rivets. It was discovered that the spacing between the rivets, along with how much the elastic was stretched before it was coupled to the liner, may influence what kind of retraction observed on the liner when the elastic is relaxed. In other words, the size of the opening of the open top end of the liner in the relaxed state may be varied based on the spacing of the rivets and/or the amount of pre-stretch or tension applied to the elastic during the process of coupling the elastic to the liner.

In addition, elastomeric materials when exposed to heat have a tendency to melt or become very tacky and gooey. In this state, the tacky and gooey elastic material will stick to the outside of the cooking vessel. When a user goes to remove the liner, the elastic hangs onto the outside of the cooking vessel, which is undesirable. Embodiments of the present invention solve this problem by forming a cuff of liner material on both sides of the elastic. Still further, the cuff may be closed to encapsulate the elastic in the liner material. For example, the elastic may be enclosed or encapsulated into a cuff of liner material by folding the liner over the elastic and by providing another seal at the bottom of the cuff. In some embodiments, an extra seal comprises an ultrasonic seal provided below the elastic and this extra ultrasonic seal does not pass through the elastic material. This seal may comprise a continuous seal to enclose the elastic completely inside the cuff. As such, the elastic material is totally encapsulated within the liner material. In high temperature applications, the liner material may comprise a high temperature material that is suitable for temperature over about 400° F. The high temperature liner material won't become tacky and won't stick to the outside of the cooking vessel. Since the elastic material is encapsulated in the liner material, it is also suitable for use in high temperature applications.

FIG. 1 is an exemplary liner 100 having an elastic securing band 110 attached to the liner 100 via a plurality of spaced-apart rivets 112. As shown in FIG. 1, the elastic 110 is incorporated around a perimeter of an open top end 140 of the liner 100 to help secure the liner 100 to a container or vessel 200 (see e.g., FIG. 10). As shown, a space 114 is provided between adjacent spaced-apart rivets 112 in which the elastic 110 is not connected or attached to the liner 100.

As shown, the liner 100 may include a substantially tubular, or bag-like, shaped body. The liner body may include a closed bottom end 120, one or more upwardly extending sidewalls 130 and an open top end 140. The liner may be designed and constructed to be disposed within a container or vessel 200 (hereinafter vessel) and the open top end 140 may be folded outward and over the rim of the vessel 200 such that the elastic securing band 110 engages an outer surface of the vessel 200 (see e.g., FIG. 10). The liner 100 may include various shapes and sizes to substantially conform to the shape and size of the vessel 200 in order to cover the interior surfaces (e.g., the bottom surface and the sidewall surface) of the vessel 200.

In some embodiments, the liner body may be formed by folding a piece of liner material in half and sealing two edges. In such an embodiment, the closed bottom end 120 comprises a folded edge and the two side edges 135 comprise sealed edges. Side panels 145 are formed between the two side edges 135 and between the bottom end 120 and the top end 140.

In some embodiments, a top portion of the liner is folded outward and downward over the elastic and the liner material is heat sealed to itself to form a cuff encapsulating the elastic therein. Alternatively, the elastic 110 may not be covered or encapsulated by the liner material. In other embodiments, a separate piece of material may be used to cover or encapsulate the elastic. The separate piece of material may or may not be the same materials as the liner. Preferably, if a separate piece of material is used, that material may be heat sealed to the liner material.

Figure 15:
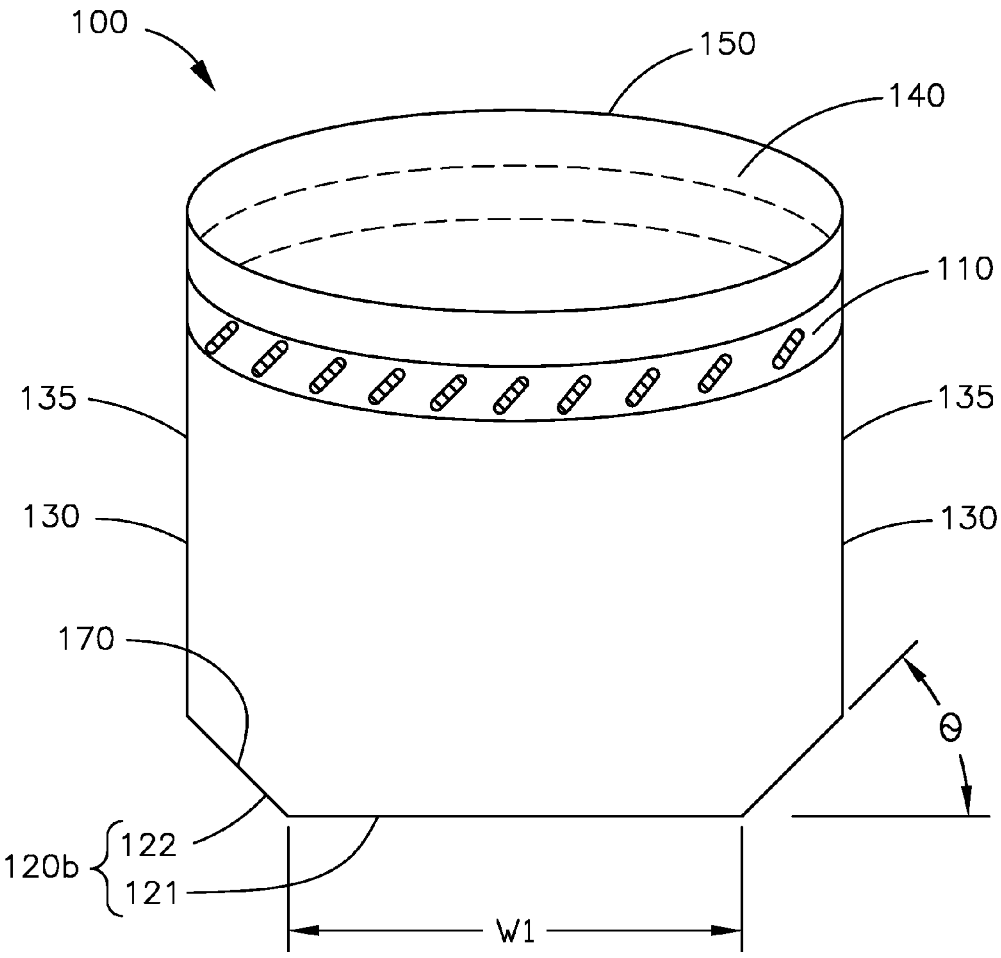
FIG. 15 shows a liner having a riveted elastic band and a contoured bottom edge.

In addition, as shown in FIG. 1 the liner 100 may include a contoured bottom edge 170, thereby preventing items contained within the liner 100 from becoming trapped in the bottom corners 160 of the liner 100. A void or dead space 165 may be formed proximate the liner corners 160 below the contoured edges 170. The tabs forming dead space 165 may be left in place or removed (e.g., cut-away), as shown in FIG. 15.

Embodiments of the present invention secure the elastic band 110 to the liner using a plurality of spaced-apart rivets. The elastic material and the liner material may or may not be heat sealable to one another. In some embodiments, the elastic material 110 and the liner material 100 do not have to be able to be heat sealed to one another in order for this technology to work. In such embodiments, it is preferred that the liner material have a higher melting point than the elastic material. It is contemplated that in some embodiment the elastic band and the liner may be heat sealable to one and other (see e.g., FIG. 1), but they don't have to be.

Figure 2:
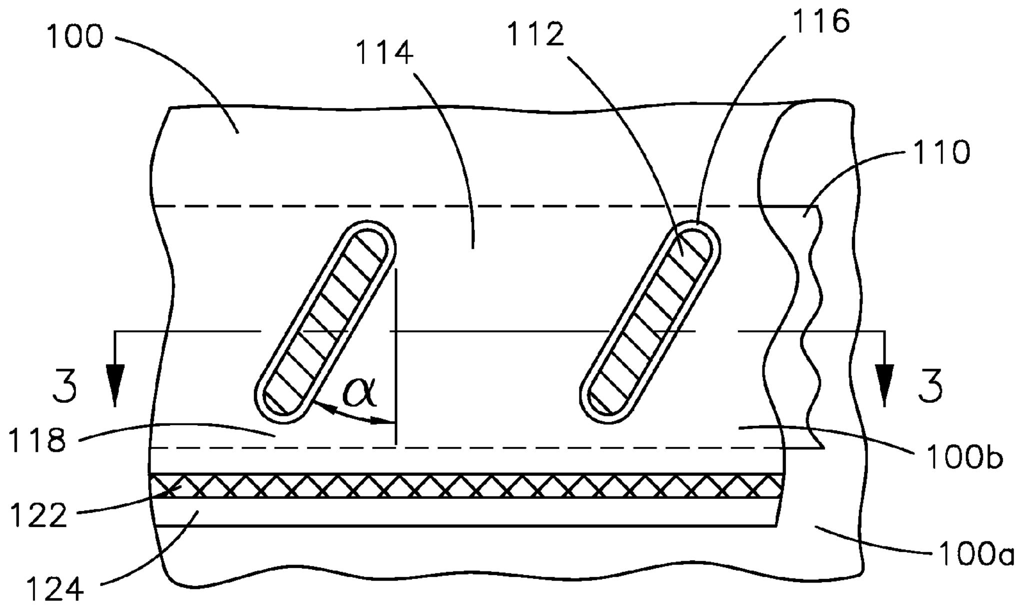
FIG. 2 is a detailed view of exemplary tack welds or rivets connecting the elastic band to the liner.
Figure 3:
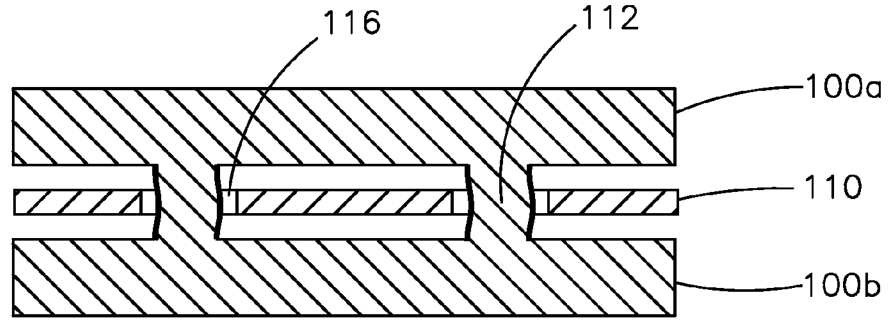
FIG. 3 is a detailed section view taking along line 3-3 of FIG. 2.

FIG. 2 is a is a detailed view of exemplary tack welds that may be used to form rivets 112 to secure the elastic band 110 with respect to the liner 100 in accordance to one embodiment of the invention. FIG. 3 is a detailed section view taking along line 3-3 of FIG. 2. As shown in FIG. 3, rivets 112 connect liner 100*a* to liner 100*b* through hole 116 in the elastic 110. As shown in FIGS. 2 and 3, the liner may include folded portions 100*a*, 100*b* in which the liner is folded about or over the elastic 110. As shown, the elastic is positioned with respect to a first portion 100*a* of the liner and a second portion 100*b* of the liner is folded over the elastic 110. Rivets 112 are formed to secure the elastic 110 with respect to the liner 100. In some embodiment, a heat sealing technique (e.g., ultrasonic sealing techniques) may be used. In some embodiments, the liner material 100*a* and 100*b* may be melted and a through hole 116 may be formed in the elastic 110 so that the liner material 100*a* and 100*b* are sealed to one another through hole 116 in the elastic 110 to form rivet 112. An air gap may exist between the liner 100 and elastic 110 in the space 114 between rivets 112.

As shown in FIG. 2, a portion of folded over liner 100*b* may extend down beyond the elastic forming a flap portion 124. The flap portion 124 may include a seal 122 to enclose the elastic 110 in a cuff 126 (see FIG. 4) formed by liner material 100*a*, 100*b*. The cuff 126 encapsulates the elastic 110 and prevents the elastic from contacting the exterior surface of the side wall of the cooking vessel 200. The outer walls of a cooking vessel, such as a slow cooker, can get very hot—e.g., sometimes approaching 250 degree F. This can make many elastic materials sticky and tacky, which may cause them to stick to the side wall of the cooking vessel. Formation of a cuff 126 to encapsulate the elastic 110 in liner material 100 prevents the elastic from sticking to the outside of the cooking vessel. Even if the elastic were to melt for some reason, it would not melt onto the outside of the cooking vessel since it is contained within the cuff of liner material.

This may be advantageous for several reasons. For example, the elastic is not exposed to or in direct contact with the hot, external surface of the cooking vessel. Also, not all elastic materials are FDA approved for direct food contact at elevated temperature. Use of a cuff to enclose the elastic may permit non-FDA approved elastic to be used in food applications since the cuff isolated the elastic and ensures that the elastic does not come in contact with food. Use of the disclosed method of tack welding the elastic to the liner to form a plurality of spaced-apart rivets prevents the elastic from separating from the liner even if the elastic breaks in one portion. Use of a cuff ensures that the elastic cannot break and come loose and fall into the food.

As shown in FIG. 2, the rivets 112 may be slanted or formed at an angle α. One advantage of forming the rivets at an angle is that it results in improved manufacturing of the liner. For example, providing protrusions on the ultrasonic welding anvil at an angle results in not all of the protrusion coming in to contact with the elastic at the same time during the manufacturing process. This results in fewer failures of the elastic while the elastic is being riveted to the liner. In some embodiments, the protrusions/rivets are formed at an angle α of about 45 degrees. In some embodiments, the protrusions/rivets are formed at an angle α of about 30 degrees to about 60 degrees.

In the illustrated embodiments, rivets 112 are located in the center portion of the elastic and do not extend to the edges of the elastic. In some embodiments, edge portions 118 of the elastic are not secured—i.e., not included as part of the rivet 112—in order to reduce the likelihood of tears forming in the elastic. This technique of not extending the rivet to the edge of the elastic is advantageous in that any notch in the elastic edge may allow a tear to propagate. Once the rivets 112 are formed and the elastic is relaxed, the edge portions 118 of the elastic may tend to curl or bunch up to form a thicker portion at the two edge portions 118 of the elastic 110. For example, in an exemplary embodiment the elastic may have a height (measured from a bottom edge to a top edge) of about 1-inch, the rivets may have a height of about ½-inch and the edge portions 118 may each be about ¼-inch in height. When the elastic is relaxed and the edge portions 118 bunch up, the height of the edge portions 118 may be reduced to about ⅛-inch, for example.

One of the advantages of this technique of securing the elastic to the liner using a plurality of spaced-apart rivets (i.e., repeats) is that if one portion of the elastic snaps, breaks, tears, or otherwise fails, the elastic band will still maintain its elasticity in the other portions of the elastic band. The rivets act to isolate the failure to the space and that portion of the elastic between adjacent rivets. The use of a plurality of rivets to connect the elastic to the liner prevents zippering of the elastic, as seen in conventional designs, and ensures that elasticity is only lost in the failed portion of the elastic band—i.e., between adjacent rivets where the elastic band actually failed. As used herein, zippering means a continuous rip along to horizontal length of the elastic. Zippering generally results in loss of elasticity and failure of the elastic band. Since a plurality of spaced-apart rivets are provided, the elasticity of the elastic band may be maintained, even in view of a failure in one portion of the elastic band. It has also been advantageously demonstrated that the elastic band may continue to function satisfactorily in view of multiple separate failures in different portions of the elastic band.

This is an improvement over conventional methods of attaching the elastic band to the liner in which a failure in the elastic band would tend to propagate (zippering) causing complete failure of the elastic. For example, using conventional techniques, the elastic could only be stretched once or twice before it failed due to the continuance weld of the elastic to the liner. In conventional systems, when any portion of the elastomer fails it literally zippers all the way down and the entire elastic band fails. Securing the elastic band to the liner in accordance with the methods and techniques of embodiments of the present invention—i.e. spot welding to provide a rivet-type effect—helps keep the elastic intact and functional between unaffected, adjacent rivets. As such, liners incorporating an elastic securing band in accordance with embodiments of the present invention may be re-used numerous times due to the improved design and construction of the liner having an elastic securing band secured using a plurality of rivets.

The use of a spaced-apart riveted design for securing the elastic to the liner improves the survivability of the elastic and ensures a longer useful life for the liner. As explained, if the elastic were to experience a localized tear, the tear will only run between the distance between the two spaced-apart rivets and will not go beyond those rivets. This design provides multiple advantages including, for example: (1) for consumers—in the event a consumer overstretched the liner during installation to a vessel and as a result a portion of the elastic tears, the liner will still function satisfactorily because the rest of the elastic band still retains its elasticity; (2) for manufacturers—in the event that a tear in a portion of the elastic occurs during the manufacturing process, the liner will still function satisfactorily because the rest of the elastic band still retains its elasticity. As a result of the riveted design for securing the elastic to the liner, the liner is suitable for consumer use and hence the manufacturer will not have to scrap the liner.

Figure 4:
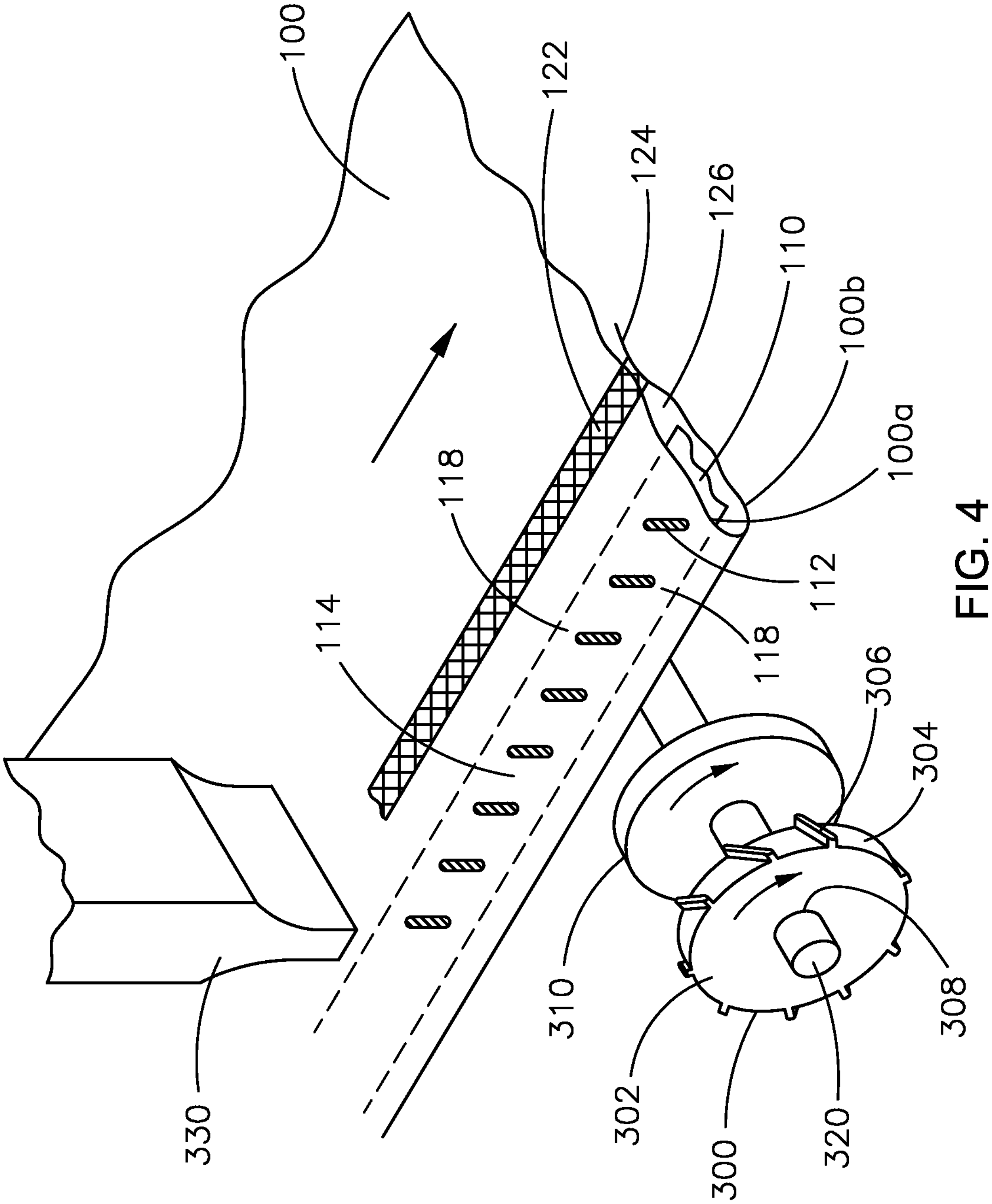
FIG. 4 shows an exemplary set-up and tooling for securing the elastic band to the liner.
Figure 5:
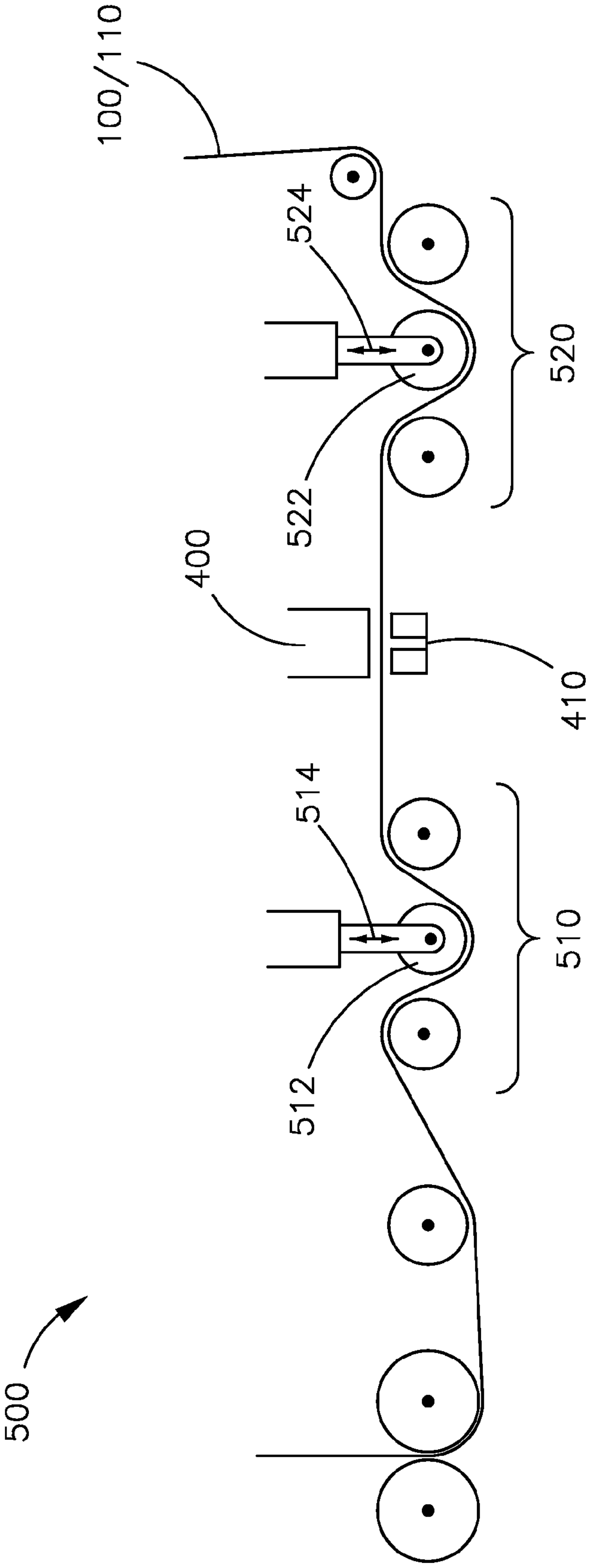
FIG. 5 shows an exemplary process for releasing elastic tension in order to create side seals of exemplary liner.
Figure 6:
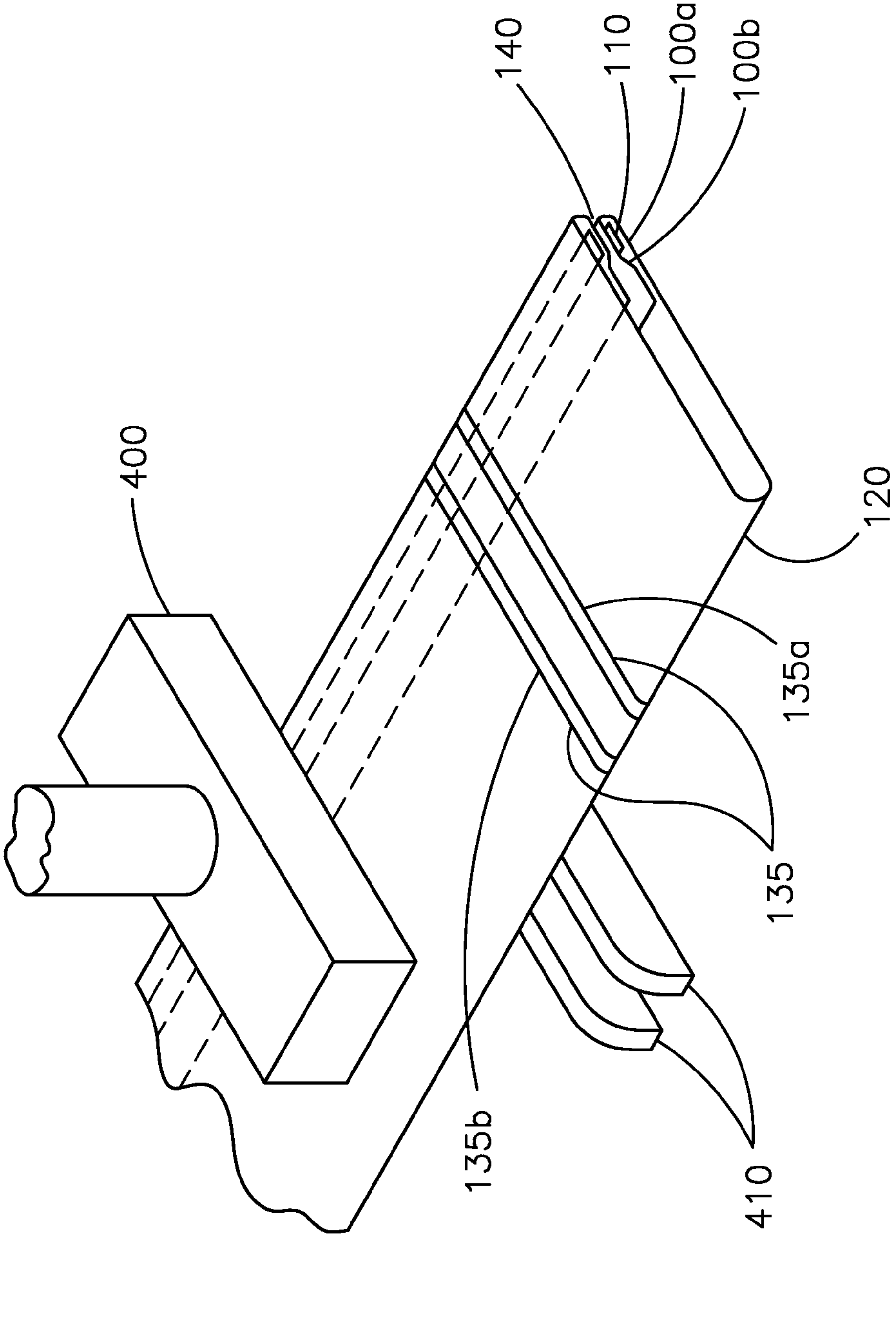
FIG. 6 shows an exemplary set-up and tooling for forming a side seal of an exemplary liner.

FIGS. 4, 5, and 6 show features and steps of an exemplary process for forming a liner with an elastic securing mechanism and an exemplary rivet forming process. FIG. 4 shows an exemplary set-up and tooling that may be used for the riveting process to secure the elastic band 110 to the liner 100. FIG. 5 shows exemplary tooling set-up and process for securing the elastic band to the liner and forming liner bags. FIG. 6 shows an exemplary set-up and tooling for forming a side seal of an exemplary bag-shaped liner.

Figure 7B:
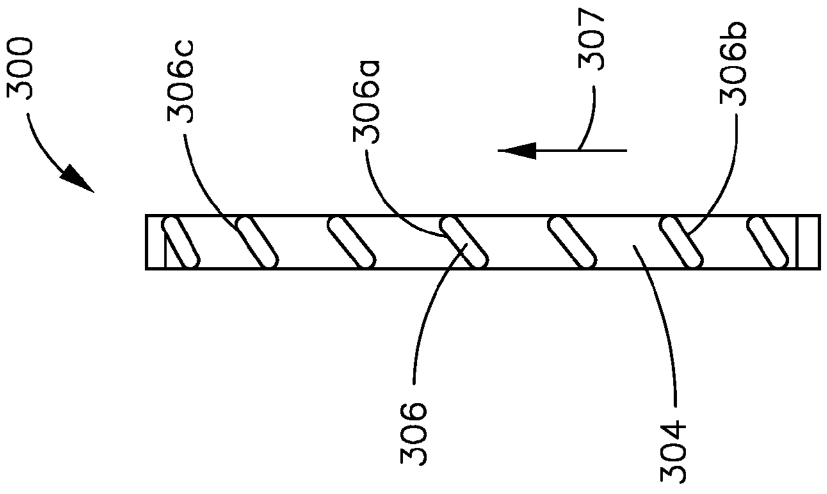
FIGS. 7A and 7B show a detailed side view and end view, respectively, of an exemplary tool for forming the rivets securing the elastic band to the liner.
Figure 7A:
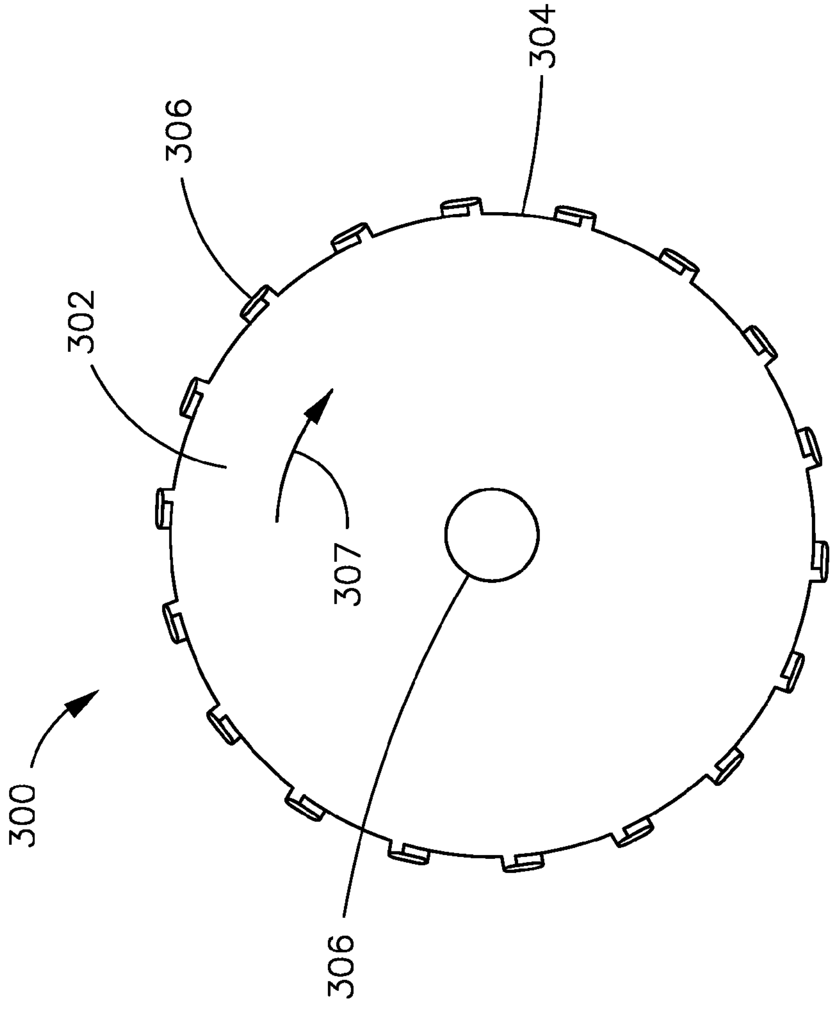
Figures 8A, 8B, 8C, 8D, 8E, 8F:
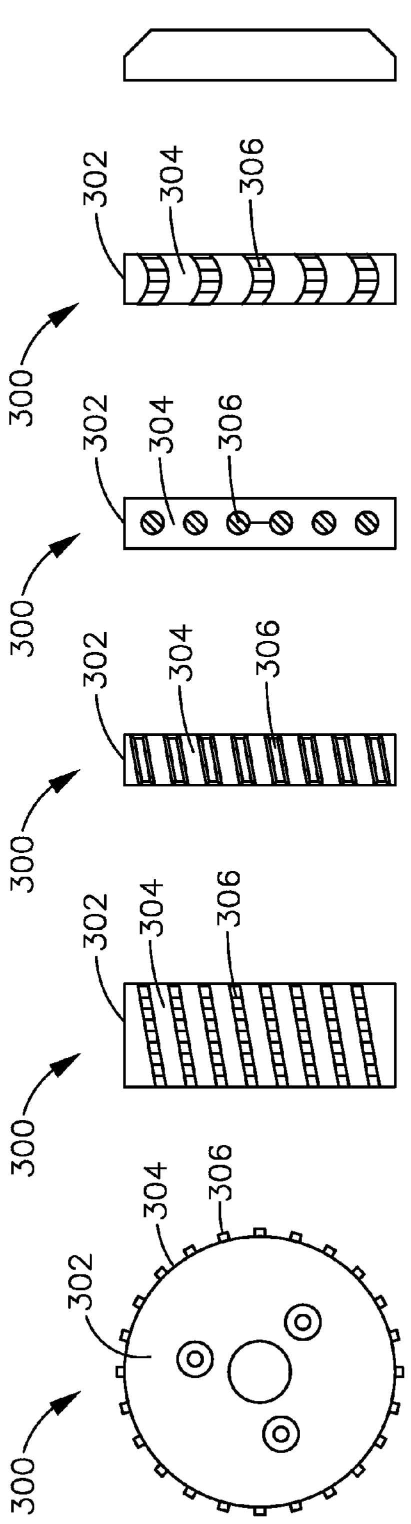
FIGS. 8A-8F show other designs that may be used to form the rivets.

As shown in FIG. 4, the elastic band 110 may be secured to the liner 100 using an ultrasonic welding anvil 300. As shown in FIGS. 4, 7A and 7B, the ultrasonic welding anvil 300 includes a wheel 302, a peripheral surface 304, and a plurality of spaced-apart, raised protrusions 306 extending radially from the peripheral surface of wheel. The ultrasonic welding anvil 300 may include a hole 308 in the center of the wheel for mounting on a rod 320 for turning the wheel 302.

FIGS. 7A and 7B show a detailed view of an exemplary ultrasonic welding anvil 300. Each protrusion includes a leading edge 306*a* and a trailing edge 306*b*. The edges 306*a*, 306*b* and the corners 306*c* of the protrusions may be rounded or beveled. In preferred embodiments, all the corners and edges of the raised protrusions 306 are broken or rounded (e.g., formed having a radius). In some embodiments, the edges are rounded. In some embodiments, the corners are rounded. In some embodiments, at least the leading edge and corners are rounded. As shown, the protrusions 306 may be slanted or formed at an angle $\alpha$. Arrow 307 shows the direction of travel of ultrasonic welding anvil 300.

As shown in FIGS. 8A-8E, various shapes may be used for the raised protrusions 306 used to form rivets 112. The size and shape of the protrusions 306 may be varied to improve the heat sealing process and avoid tearing of the elastic during formation of the rivets. The design of the raised protrusions may comprise, for example, question marks, circles, squares, rectangles, slanted commas.

Figures 9A, 9B, 9C:
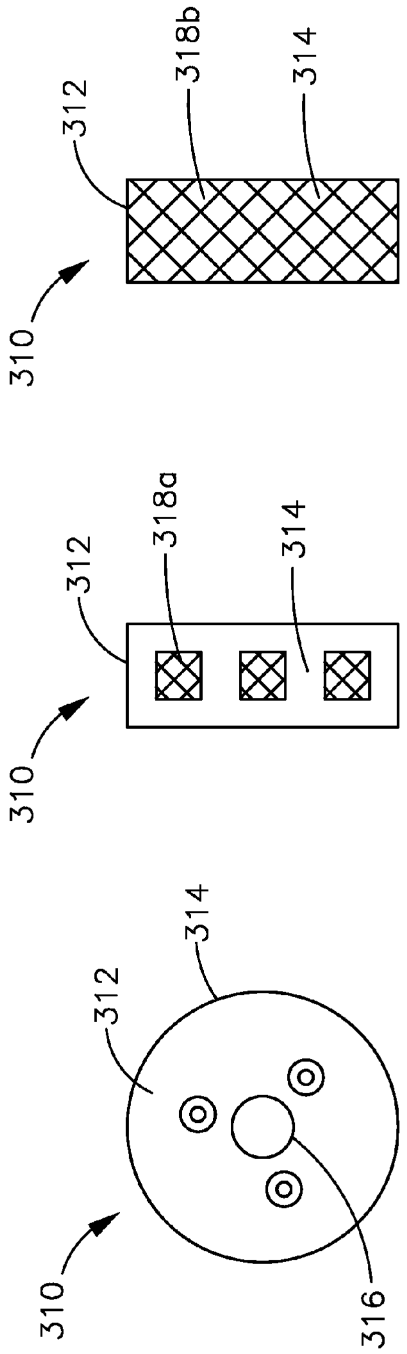
FIGS. 9A-9C show other exemplary designs for forming the cuff seal.

Also shown in FIG. 4 is an ultrasonic sealing wheel 310 for sealing the liner material 100*a* to liner material 100*b*. As shown in FIG. 9A, heat sealing wheel 310 includes a wheel 312, a peripheral surface 314, and a hole 316 in the center of the wheel for mounting on a rod 320 for turning the wheel 312. Seal 122 closes cuff 126 and encapsulates elastic 110 within the liner material 100 (see e.g., FIG. 4).

FIGS. 9A-9C show an exemplary ultrasonic sealing wheel 310 and exemplary designs for forming the cuff seal. As shown in FIG. 9B, a spaced apart pattern 318*a* may be used to form a non-continuous seal 122. As shown in FIG. 9C, a full pattern 318*b* may be used to form a continuous seal 122.

The disclosed embodiments improve the efficiency of producing liners having an elastic securing mechanism. As illustrated in FIGS. 4-6, the elastic may be continually applied to the liner off a spool or roll (not shown). This allows for continuous production. Unlike some conventional liner or cover systems (e.g., CoverMate™ or other similar art where rubber bands have to be inserted one at a time), the liners having an elastic securing band in accordance with preferred embodiment of the present invention do not need to be manufactured one piece at a time.

In some embodiments, this technology allows for the manufacture of side seal bags (see e.g., FIG. 6 and FIG. 1). In some embodiments, this technology allows for the manufacture of shaped or contoured bottoms (see e.g., FIG. 1 and FIG. 15). Conventional cover systems, for example the CoverMate™ technology, only allows the application of elastic to a "sheet" not a bag/liner; therefore, the sheet cannot be shaped to fit the cooking vessel. Also, the sheet is limited by its depth of draw into the cooking vessel. The present technology allows for the construction of a liner which will better fit the cooking vessel having a receptacle for receiving food.

The following describes an exemplary process of forming the bag-shaped liner and applying the elastic to the liner. Advantageously, this technique makes itself readily adaptable to conventional plastic bag manufacturing techniques with some additional/modified steps to apply and secure the elastic to the liner. The liner may spool off continuously while also spooling off continuously the elastic under tension or in a pre-stretched state. The elastic is applied to the liner and at the same time one edge of the liner may be folded over the elastic to form a cuff. As shown in FIG. 4, the cuff having the elastic positioned therein feeds into a set of ultrasonic sealing horns which weld the materials to create the rivets—e.g., welding the liner material together through a hole burnt through the elastic. As shown, the rivets are formed as a plurality of spaced-apart rivets that extend across a central portion of the elastic. Also as shown, the rivets are preferably formed at an angle $\alpha$ to an imaginary transverse line extending between the opposite edges of the elastic. A separate cuff seal may be formed using an ultrasonic welding anvil to encapsulate the elastic.

From this point on, the bag forming and manufacturing process may be performed as described in U.S. patent application Ser. No. 12/160,623, entitled Slow Cooker Liner With Securing Band, which is herein incorporated by reference in its entirety. This method allows for the continuous production of bag-shaped liners having integral elastic securing bands in a very efficient, and at low cost process. This is an improvement over other, competing art such as the techniques that Covermate™ uses where they actually have to cut individual sheets and then put a rubber band around a fixture and then bring up the cuffs around the rubber band and seal the rubber band in the cuff.

During manufacturing, the elastic and liner materials are maintained under tension until adjacent liner bags are cut apart. It was found that relaxing the tension on the materials just prior to forming the side seals was advantageous and avoided stretching of the materials and seal when the seal wires came down into contact with the materials to be sealed. If the elastic is under tension and not relaxed prior to sealing, the seal tends to stretch because there's tension on it from the elastic. In other words, when the liner materials are melting together, it's actually stretching apart and as a result seal failures may occur.

FIG. 5 shows a set-up and tooling 500 for relaxing the tension on the elastic during seal formation. The fixture allows the elastic to relax a little bit (e.g., the elastic is still under tension, but partially relaxed), as the seal bar 400 comes into contact with the liner. This problem of tension of the elastic causing seal failures during manufacturing is more pronounced at the top of the liner where the elastic is located. It was discovered that partially releasing the stretch or pretension of the elastic improved the seal formation process.

In some embodiments, a series of rollers are used to advance the materials, under tension, as they travel through the manufacturing process. As shown, a set of tensioning rollers 510, 520 may be provided to relax the tension on the elastic right when the seal bar comes down to form the seal. As illustrated, three rollers may be provided on each side (front side tensioning rollers 510 and rear side tensioning rollers 520) of the seal bar. The center rollers 512, 522 may move up and down (see arrows 514, 524) to increase or decrease the tension. It is desirable that the tension release equally on the front and rear roller sets 510, 520 when the seal bar comes down. The reason for this is because, in the illustrated embodiment, two seals are being formed—i.e., a side edge seal 135*a* of a leading liner bag and a side edge seal 135*b* of a trailing liner bag (see FIG. 6). Preferably, the tension is relaxed just before the seal bar comes down and just long enough for the seal bar to form the seal.

In the illustrative embodiment, the liner is taut as the liner material is being advanced in order to allow for proper folding over of the liner material in half and to ensure the pieces track correctly. But when the seal is being made, the roller sets 510, 520 shown in FIG. 5 allow the top center rollers 512, 522 to come off and release/relax the elastic as the sealing bar 400 come into contact with the sealing wires 410 and the seals are made.

As shown in FIG. 6, one embodiment of forming the bag-shaped liner is illustrated. In this embodiment, pre-stretched elastic is positioned along each edge of the taut liner material and then the liner edges are folded partially over onto the rest of the liner to cover the elastic and form a cuff. The sheet of liner material is then folded in half to start forming the bag-shaped body. As shown, the materials then run through a sealing bar 400, 410 which seals the front liner panel and the rear liner panel together and forms side edge seals 135*a*, 135*b*. As shown, the sealing bar may include two wires 410 to form two spaced-apart side seals at the same time. The ends of the elastic band are sealed between the side seals. The bag-shaped liners having an elastic securing mechanism continue through the rest of the machine and is subsequently cut between the two side seals 135*a*, 135*b*, which is the beginning and the end of each individual liner bag.

Figure 10:
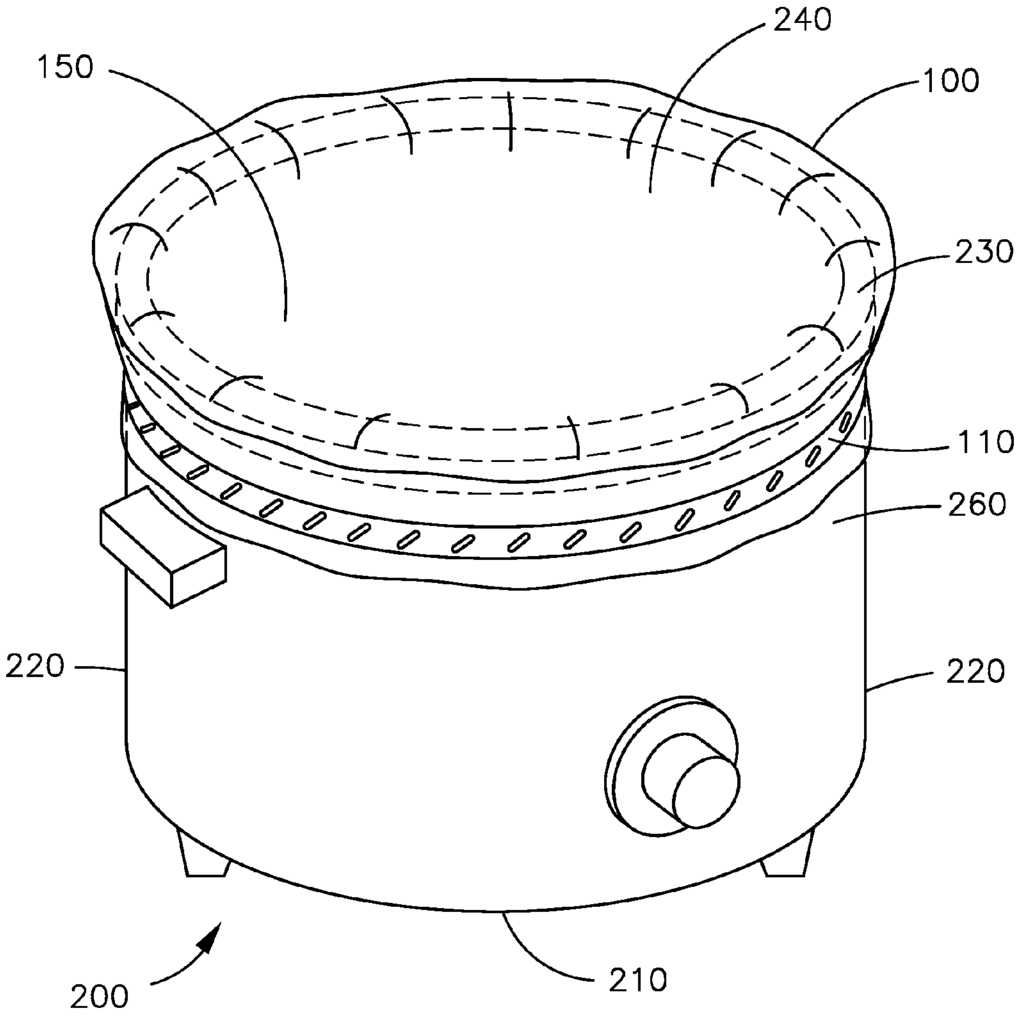
FIG. 10 shows an exemplary liner having a riveted elastic securing band in use with a slow cooker.
Figure 11:
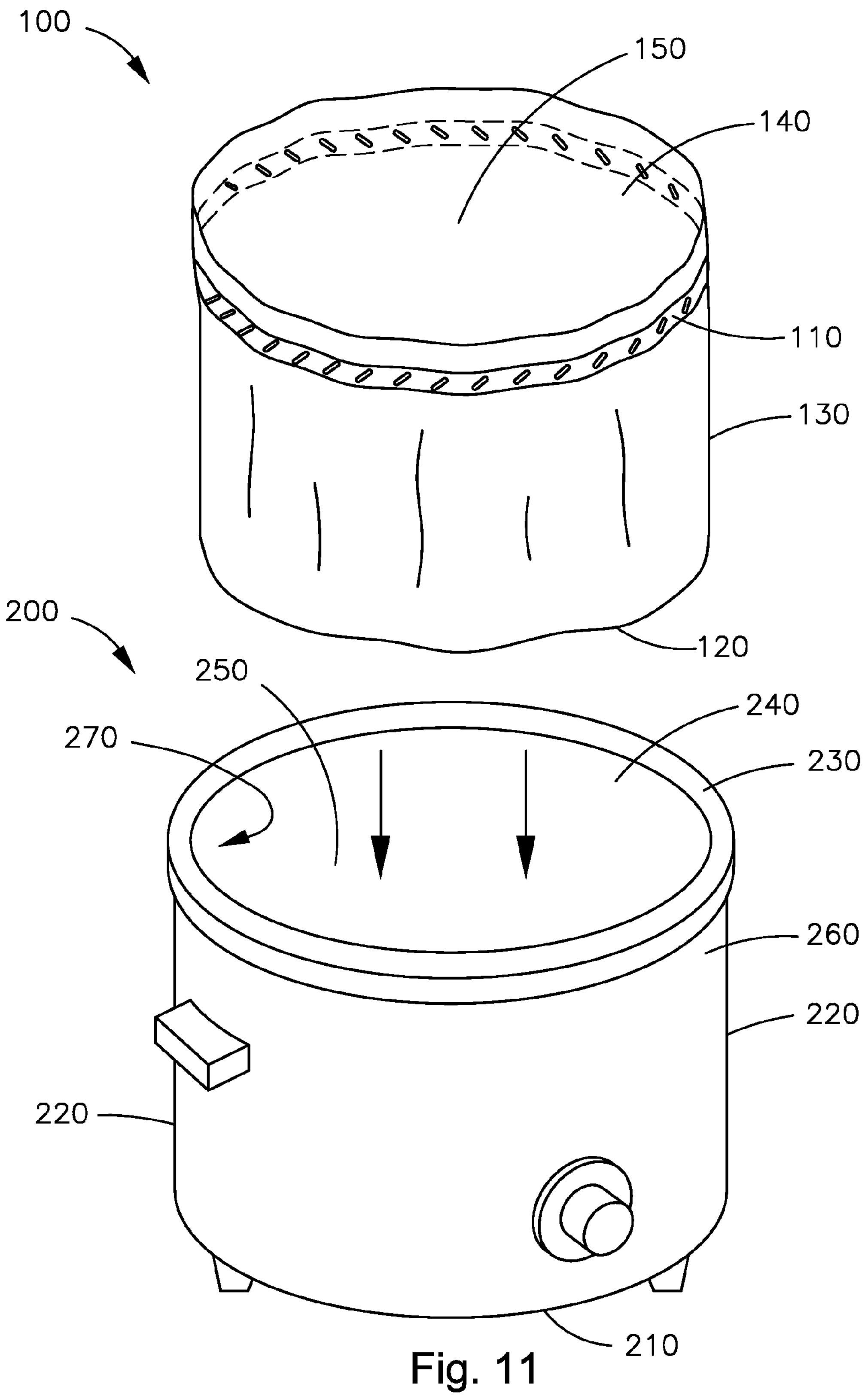
FIG. 11 shows an exploded view of the liner/cooking vessel set-up of FIG. 10 prior to insertion of the liner into the cooking vessel and prior to folding of the top open portion of the liner over the top edge of the cooking vessel.
Figure 12:
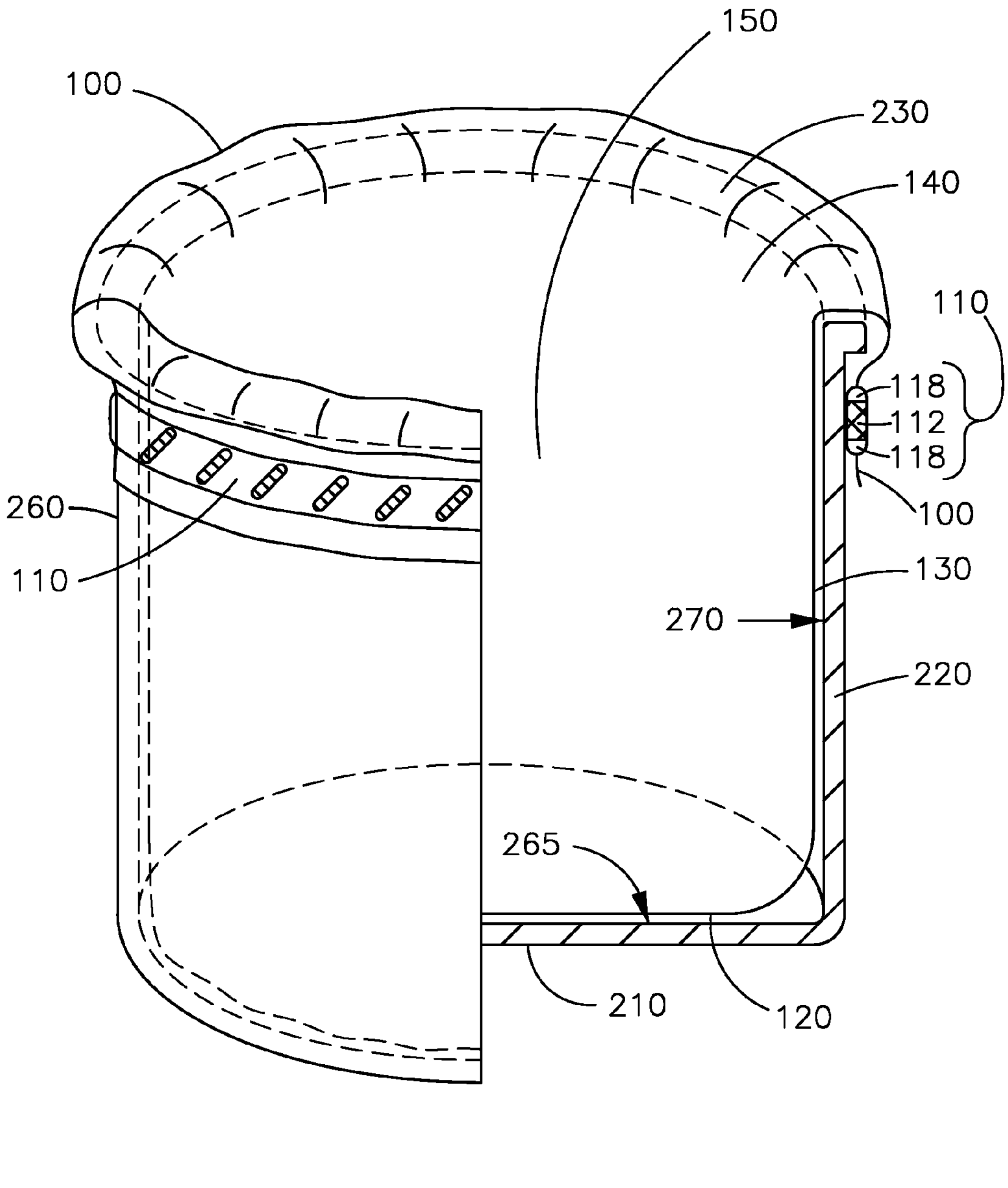
FIG. 12 shows a partial cross-sectional view of the liner/cooking vessel set-up similar to FIG. 10.

FIGS. 10-12 show the liner in use in an exemplary vessel 200. As shown in FIGS. 10-12, the vessel 200 may comprise a cooking vessel, and more particularly a slow cooker. In use, the closed bottom end 120 of the liner 100 is disclosed over the bottom 210 of the cooking vessel 200 and the side wall(s) 130 of liner 100 is disposed over side wall(s) 220 of the cooking vessel 200. The open top end 140 of the liner may be folded outward over the rim 230 that forms a top opening 240 of the cooking vessel 200 such that the elastic securing band 110 engages an outer surface of the cooking vessel 200. As shown, the liner 100 may be placed within a receptacle 250 of the cooking vessel 200, such as a slow cooker, in order to form a barrier between the slow cooker and food being cooked/heated in the slow cooker.

As shown, the closed bottom edge 120 and the upwardly extending side walls 130 of liner 100 define a food holding vessel 150 that may be inserted in to receptacle 250 of vessel 200 and that is capable of holding a volume of food, for example, that is disposed therein for heating or cooking. Preferably, the liner 100 is generously sized to afford complete coverage of the cooking vessel 200 and allow an excess portion of the liner 100 proximate the open top end 140 to be stretched outwardly and folded downward over the rim 230 of the cooking vessel 200. The elastic band 110 may then contract thereby holding the excess portion of the liner to an exterior surface 260 of the cooking vessel 200.

As shown in FIG. 10, the elastic securing band may be incorporated around a perimeter of an open top end 140 of the liner 100. The elastic may help keep excess liner material proximate an upper portion of the liner 100 secured and snuggly fit over the rim 230 and around the outside 260 of the cooking vessel 200. The elastic band 110 may keep any excess liner out of the way of the cooking process and improve the aesthetic appearance of the liner 100. Also, the elastic band 110 may reduce and/or prevent the liner 100 from falling into and/or settling down into the receptacle of the cooking vessel 200 and the food contained therein.

The slow cooker liner may include a size and shape to substantially conform to the receptacle (i.e., the interior surfaces) of the container or vessel 200 in which it is being used. Although some forming may occur once the liner has been disposed within the vessel of the slow cooker, such as moisture adhesion and thermal-forming as the slow cooker is heated, the liner may be preformed having a closed bottom end 120 and upwardly extending sidewalls 130 which may define the food holding vessel 150 which may be sized and shaped to fit within and cover the interior surface 270 and bottom surface 265 of the receptacle 260 of the cooking vessel 200. In addition, the weight of the food may also exert some pressure on the liner which also helps to further form the liner to the cooking vessel 200.

Figure 13B:
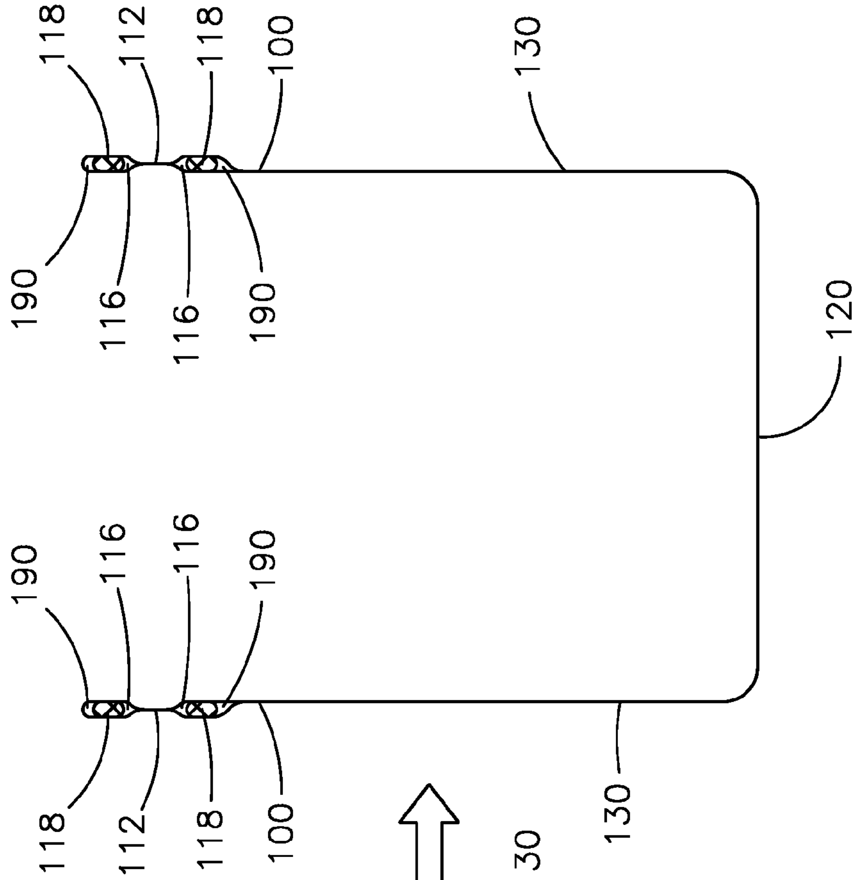
FIGS. 13A and 13B show one method of encapsulating the riveted elastic band in the liner material.
Figure 13A:
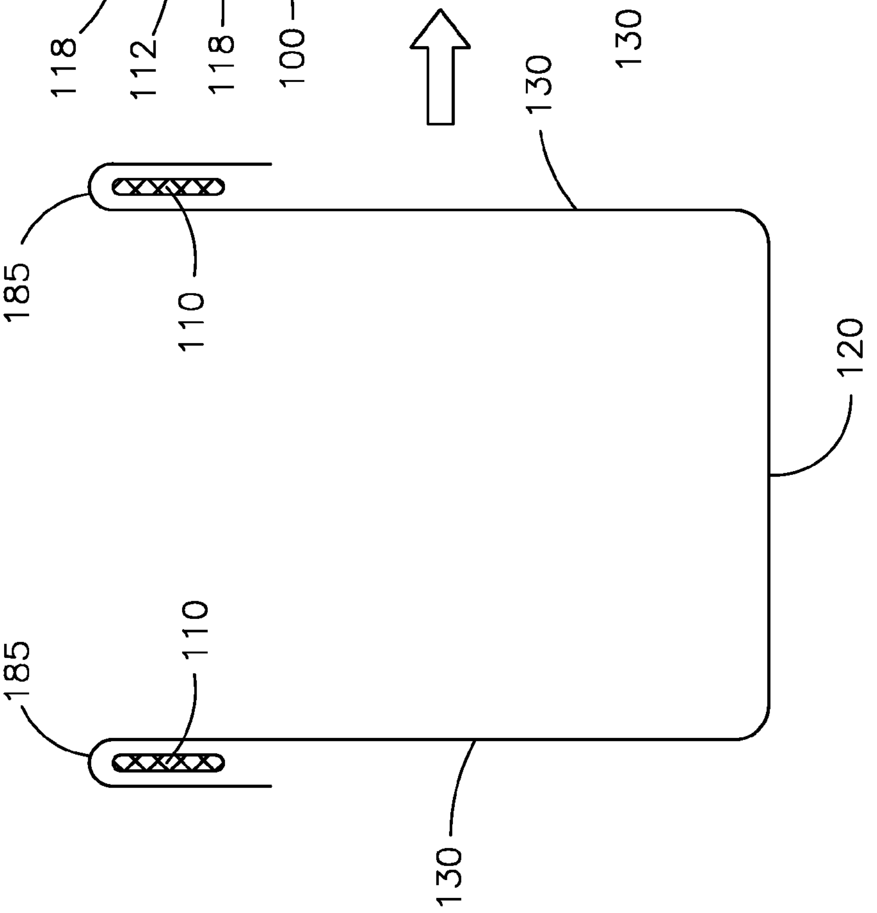

FIGS. 13A-14B show exemplary embodiments for forming the cuff 126 for encapsulating the elastic 110 in the liner 100. As shown in FIGS. 13A and 13B, the elastic securing band 110 may be enclosed within the liner material by folding the liner material 100 (either outwardly, as shown, or inwardly, not shown) to cover the securing band 110. The folded portion 185 may then be attached to the liner sidewall 130 to encapsulate the securing band 110 within a cavity 190. A benefit of this folded embodiment is that only one edge needs to be sealed to enclose the securing band.

Figures 14A, 14B:
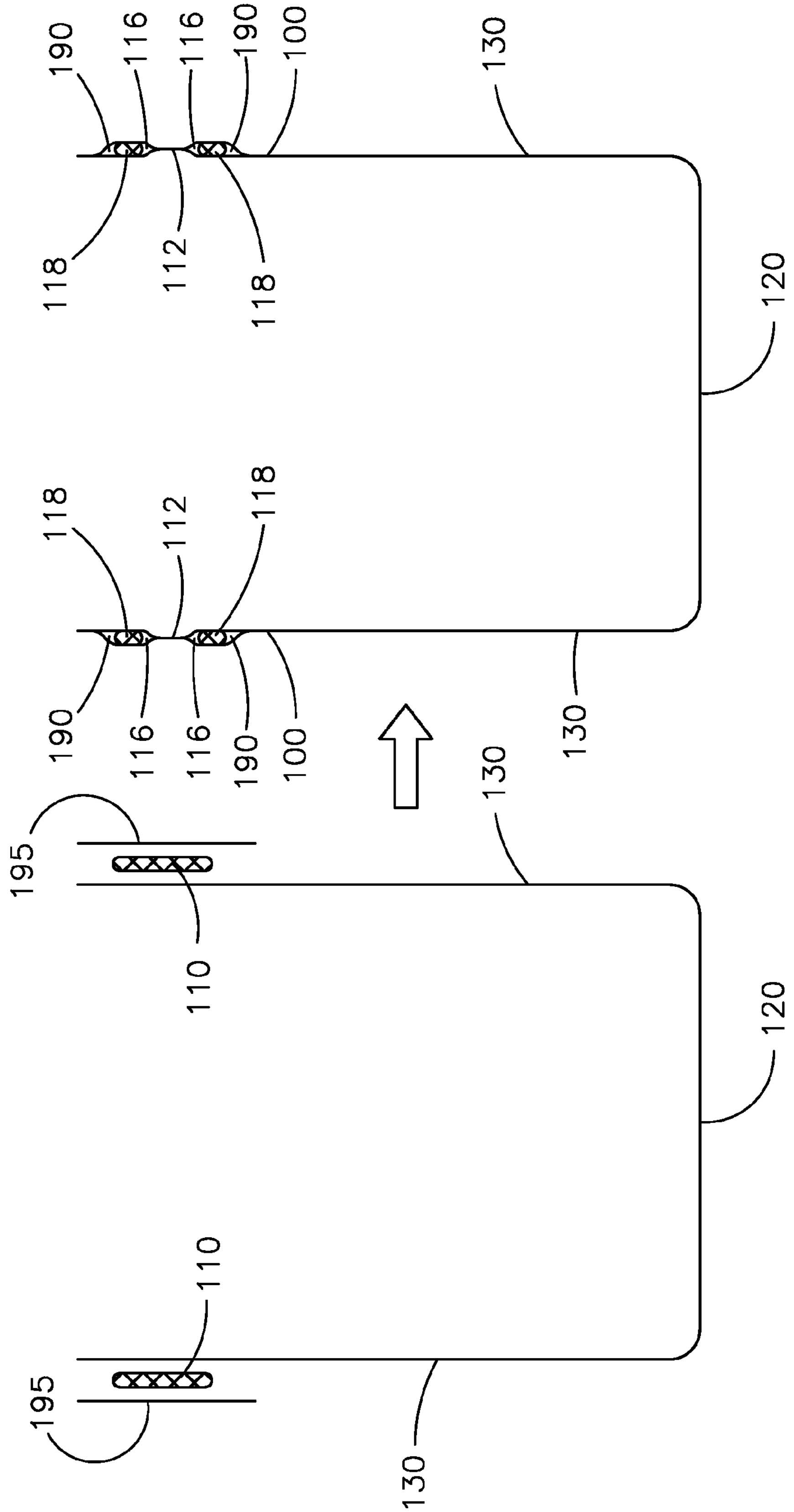
FIGS. 14A and 14B show another method of encapsulating the riveted elastic band in the liner material.

In another embodiment shown in FIGS. 14A and 14B, a separate liner strip 195 may be placed over the securing band 110 (either on the outside of the sidewall 130, as shown, or inside of the side wall 130, not shown). The liner strip 195 may then be attached to the liner side wall 130 to encapsulate the securing band 110 within a cavity 190. A benefit of this embodiment is that a special device is not needed to fold the edge of the liner over the securing band.

In addition, as shown in FIG. 1 and FIG. 15 the liner 100 may be formed having a contoured bottom edge, thereby preventing food from becoming trapped in the bottom corners of the liner. As shown in FIG. 15, the contoured bottom edge 120*b* having a flat bottom edge 121 and one or more contoured or shaped edges 122, wherein the contoured edges 122 include one or more tapered, or sloped, edges. Each contoured edge may extend outward and upward from the flat bottom edge 121 and may join and merge an opposite end of the flat bottom edge 121 with one or more of the side wall 130 sealed edges. The tapered edges may form an angle θ with a bottom plane. Accordingly, the improved slow cooker liner having a contoured bottom edge also helps improve food safety, helps maintain food quality, reduces shrinkage, and may reduce labor costs and resource consumption.

Another advantage of this technology over sheet style liners (e.g., Covermate™ Aluminum Foil) is that, because you are actually producing a bag or a tubular-shaped liner instead of just a sheet, you can put shapes into the bottom of a liner. For example, a contoured bottom edge (as described above), a gusseted bottom, etc. that substantially conforms to the vessel in which the liner will be inserted.

The following, non-limiting list of materials, are suitable materials for the liner 100 (listed in order of preference): nylon; polyester; polyester elastomer; polyamide elastomer; and polyolefins. The following list of exemplary materials is provided to further illustrate suitable liner materials:

| | |
|---|---|
| Examples of Nylon: | |
| Nylon 6; Nylon 66; Nylon6/66 copolymer; Nylon 12; and blends thereof. | |
| Examples of Nylon 6: | |
| BASF | B40LN01 |
| Honeywell | H155WP |
| DSM | F136-C1 |

| | |
|---|---|
| Examples of Nylon 66: | |
| Solutia | 66J |
| Solutia | 66B |
| Nilit | P240 |

| | |
|---|---|
| Examples of Polyester: | |
| DuPont | Mylar 800 |
| DuPont | Mylar OWF |
| DuPont | Mylar 850H |

| | |
|---|---|
| Examples of Polyester Elastomer: | |
| DSM | Arnitel EM630 |
| Ticona Riteflex 863 | |
| and blends there of. | |

| | |
|---|---|
| Examples of Polyamide Elastomer: | |
| Arkema | Pebax 1878 |
| Arkema | Pebax 7073 |
| and blends there of. | |

| |
|---|
| Examples of Polyolefins: |
| Low Density Polyethylene |
| Medium Density Polyethylene |
| High Density Polyethylene |
| Polypropylene |

The following, non-limiting list of materials, are suitable materials for the elastic 110 (listed in order of preference): polyester elastomer; polyamide elastomer; and polyolefin elastomer. The following list of exemplary materials is provided to further illustrate suitable elastic materials:

| | |
|---|---|
| Examples of Polyester Elastomer: | |
| DSM | Arnitel EM400 |
| Ticona Riteflex 830 | |
| and blends there of | |

| | |
|---|---|
| Examples of Polyamide Elastomer: | |
| Arkema | Pebax 4033 |
| Arkema | Pebax 3533 |
| Arkema | Pebax 2533 |
| and blends there of. | |

| | |
|---|---|
| Examples of Polyolefin Elastomer: | |
| Basell | Adflex Q401 F |
| Dow | Engage 8445 |
| and blends there of. | |

One currently preferred embodiment comprises a liner made from a blend of about 60% nylon 6 and about 40% heat stabilized nylon 66; and an elastic made from Polyester Elastomer with a Shore D hardness of about 25-40, such as DSM Arnitel EM400, Ticona Riteflex 830, or similar materials, and blends thereof. Nylon does not seal to polyester elastomer, yet embodiments of the present invention allow a polyester elastomer to be secured to a nylon film using the riveted design described herein. Advantageously, the methods and heat sealing techniques disclosed herein allows materials which are not necessarily heat sealable to one another to be secured together.

In some embodiments, the melt point of the liner material is the same or higher than the melt point of the elastic. In embodiments where the liner material has a higher melt point than the elastic material, this allows the ultrasonic sealer to burn through the elastic, and melt and seal the liner material to itself through the hole burnt through the elastic. This process effectively forms a tack weld or rivet. In this embodiment, it is not necessary for the liner material and the elastic to be heat sealable to one another. In embodiments where the liner material and the elastic material have the same melt points and the materials are heat sealable to each other, then the liner material will heat seal to the elastic material at the tack point or rivet. As can be appreciated, if the liner material has a lower melt point than the elastic then a hole cannot burn through the elastic and so the tack weld cannot be formed.

In certain preferred embodiments, it is advantageous to have the melt point of the liner material be slightly higher than the elastic material. The reason for this is that for some embodiments it is desirable to burn through the elastic material and weld the liner material to itself. Whereas, if you had a very high melt point elastic material, you'd be melting one surface of the liner cuff, you would never melt through the elastic and you would never create the weld. So it is preferred that the liner material have a slightly higher melt point than the elastic material.

In a preferred embodiment, the rivet is formed via heat sealing using ultrasonic energy. As way of example, the liner may have a higher melt point than the elastic and ultrasonic energy is used to burn a hole through the elastic while simultaneously melting and welding the liner material together through the hole burnt through the elastic. In one example, the liner material may comprise a nylon blend having a melt point of about 450 degree F., and the elastic material has a melt point of about 365 degree F.

The liner having an elastic securing band is preferably suitable for high temperature applications. As used herein, high temperature means the liner and elastic securing band are preferably made from materials suitable for use in high temperature applications of between about 100 degree F. and about 400 degree F. In high temperature embodiments, the liner having an elastic securing band can withstand temperatures up to about 400 degree F.

In certain applications, the liner materials or composition is preferably a high temperature nylon film or a high temperature polyester film capable of withstanding 400 degrees F. or more. In certain applications, the liner materials or composition is preferably safe to contact food under cooking conditions. Other suitable materials are high temperature polyester elastomers, high temperature polyamide elastomers, and high temperature polyolefin and polyolefin elastomers.

Since the liner is a flexible film, and since the liner has an elastic opening, one size liner can fit a wide variety of slow cooker sizes. This provides an advantage over rigid liners, such as those made from aluminum foil. Flexible liners having an elastic top opening do not need to be sized exactly to fit the vessel. Since the liner is flexible, it can conform to walls of the cooking vessel, allowing for good contact and heat transfer between the heated walls of a cooking vessel and the food contained therein.

Embodiments of the present invention contemplate that different structural features may be varied to control the performance and characteristics of the liner with elastic securing mechanism. Examples of features that may be varied for this purpose include: varying the number of protrusions, or the spacing between the rivets; varying the amount of stretch (pre-tension) of the elastic prior to tack welding the elastic and liner; or both. Varying and controlling one or more of these features allows one to better control the elasticity of the liner opening. By varying the spacing between rivets, and/or by varying the tension on the elastic just prior to welding, one can make the liner opening: completely closed (a lot of elasticity); or only partially closed (medium elasticity); or not closed at all (very little elasticity) when the elastic is relaxed.

Different applications/uses of the liner having an elastic securing mechanism may require different elasticity characteristics of the top opening of the liner. For example, containers or vessel come in different sizes and shapes. Slow cookers, for example, come in several different standard sizes and for each the physical opening of the receptacle of the slow cooker—e.g., the circumference—will vary. In some embodiments, the liner includes an open top end that may be stretched to be equal to or greater than the largest slow cooker opening that you're going to use it with while at the same time being properly sized to also having sufficient elasticity so that the liner also fits smaller sized slow cookers. Users desire a neat fit and appearance of the liner to the vessel it is being used with. Preferably, the elasticity may be adjusted so that one size liner will service multiple size vessels. For example, one size liner may be stretched to be easily inserted into the largest slow cooker liner and still have enough elasticity to cover several sizes down from there while still having a nice neat appearance. In other embodiments, different size/shape liners may be used for different vessels.

In addition to the primary purposes of using these liners in cooking vessels, such as slow cookers, to improve the aesthetic appearance of the slow cooker liner system and also to prevent the liner from falling down into the cooking vessel, there are other advantages. For example, it is not unusual for people to transport slow cookers from one location to another in their car. Lids tend to fall off the top of a slow cooker when the slow cooker is bouncing around in the car. So if you have enough elasticity built into the liner's elastic securing band, and you remove upper portion of the liner and the elastic band from around the outside top rim of the slow cooker and leave the liner in the slow cooker, the top opening of the liner contracts due to the elasticity of the elastic band to create a container having a scrunched top opening that partially seals or closes the top opening of the liner thereby helping contain foods (or other objects) therein.

Figure 16:
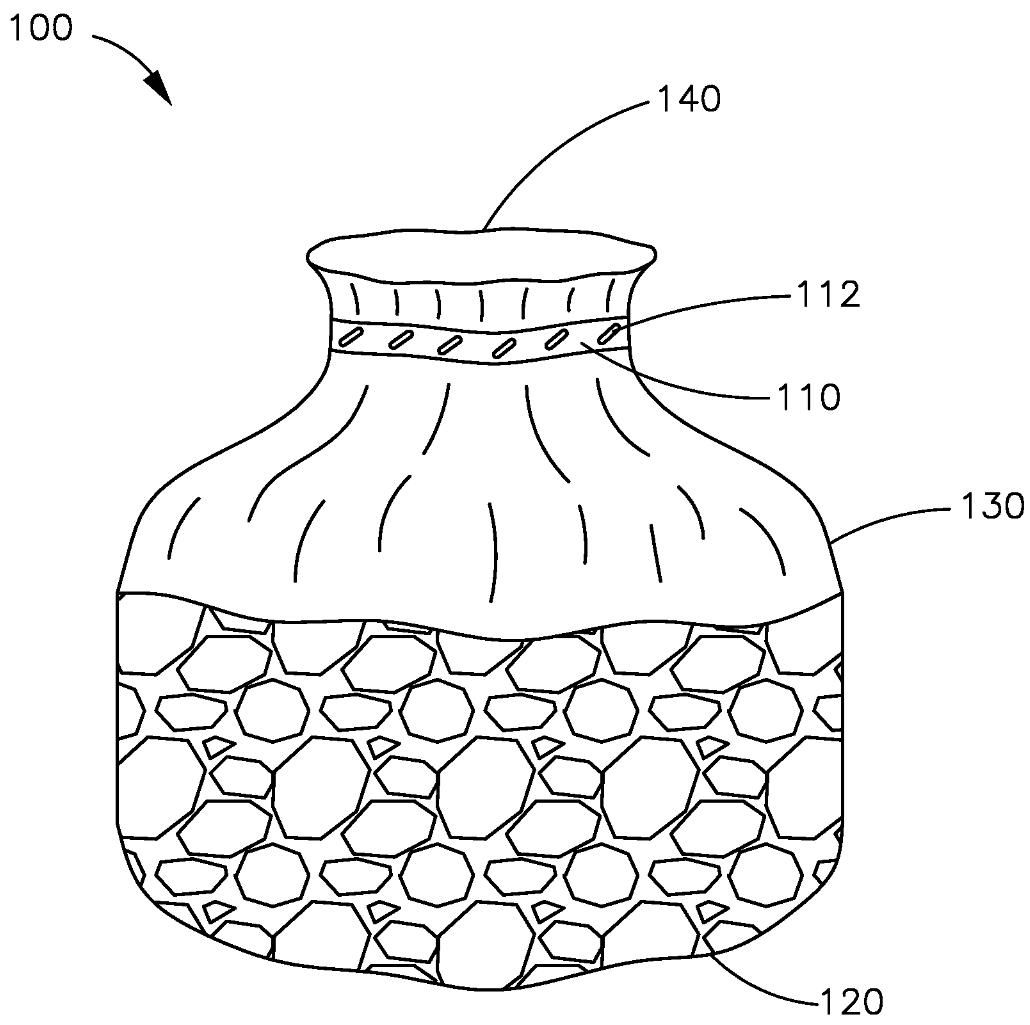
FIG. 16 shows an exemplary closure formed by a scrunched top opening of the liner having an elastic securing band.

As shown in FIG. 1 and FIG. 16, this closure feature facilitates ease of transport of the loaded slow cooker with the contents secured in the slow cooker without the need for a separate lid, as these lids have a tendency to fall off and cause the food to splash all over the car. If the cooking vessel doesn't have a lid, the liner having an elastic band in accordance with embodiments of the present invention effectively forms a closure or seal, so a user does not need to apply aluminum foil or stretch film over the opening of the cooking vessel in order to transport it. Also, a separate lid would not need to be cleaned if one is not used, facilitating easy clean up.

Further, the closure or seal features allows a user to remove the liner and its contents from the slow cooker for storage in a refrigerator, for example. Upon removal from the slow cooker, the top opening of the liner closes due to the elasticity of the elastic band to help contain the contents of the liner therein. As such, one can remove the food from the cooking vessel in the liner and store in a refrigerator without the need to secure the liner closed with twist tie or pull tie.

Figure 17:
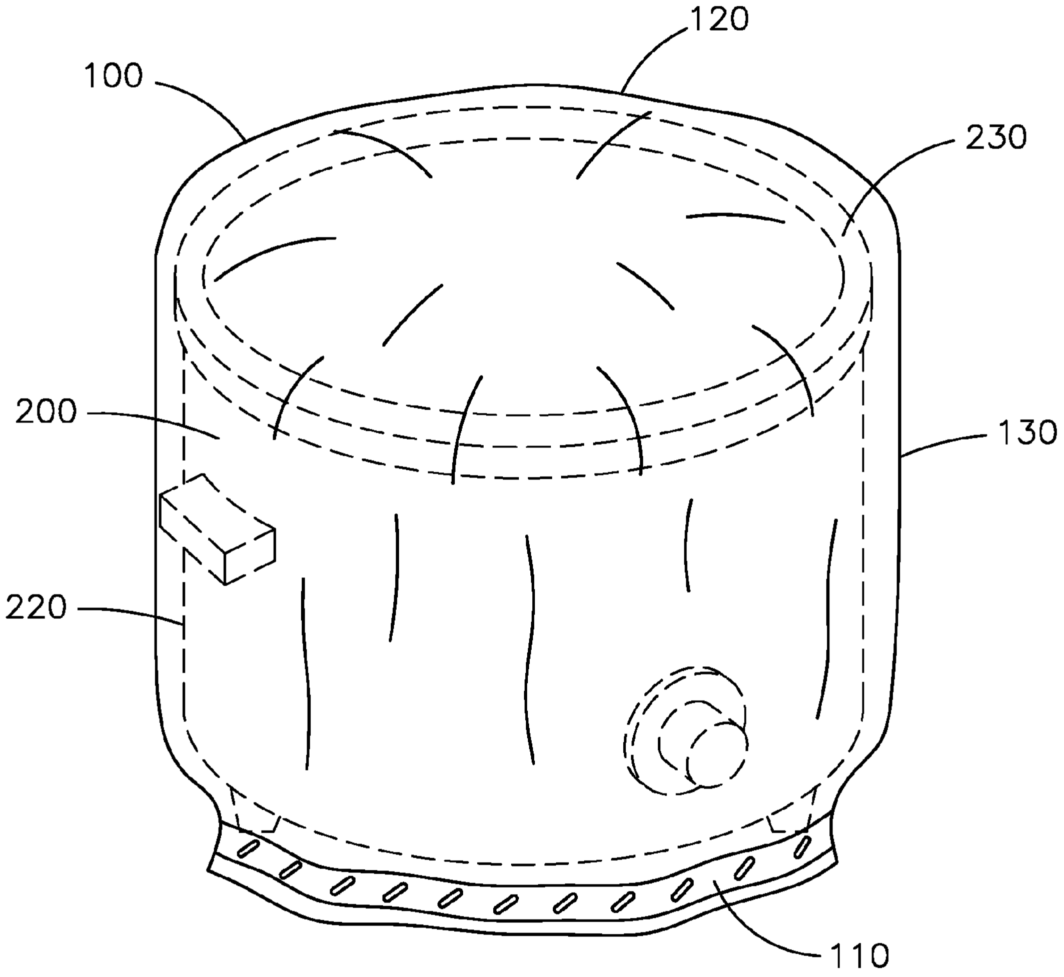
FIG. 17 shows a liner having an elastic band that has been reversed to form a lid or cover.

Yet another use and advantage of the liner having an elastic band is that the liner can be reversed to form a lid or cover, as shown in FIG. 17. That is, rather than inserting the liner into the top opening of the slow cooker to cover the interior surfaces, the liner may be stretched and placed over the top opening and rim of the slow cooker such that the body of the liner forms a lid or cover. During transport, a separate or second liner may be used to cover the slow cooker in addition to a first liner that may be in use lining the interior surface of the slow cooker. Use of the liner as a lid makes transport easy and reduces/prevents spills. As such, embodiments of the liner make for a "makeshift" cooking lid when none are available since the liner may be suitable for high temperature applications. Again, this use eliminates the need to clean the cooking vessel's lid. The size of the liner may vary or different size liners may be provided to ensure a proper fit of the liner lid to the vessel. Still further, even if the container lid is being used, a liner may be reversed and placed over the lid and container to hold the lid in place and avoid spills.

Although many of the embodiments described herein include a vessel that is a cooking vessel or slow cooker, the invention and technology described herein are not limited to such applications/uses. The invention may be useful with any container or vessel (e.g., cooking vessel, pot, pan, steamer, tray, bucket (ice), can (trash can), drum, box, etc). For high temperature applications, the invention may be useful with any type of cooking apparatus or vessel. The liner and elastic securing band may also be applicable to steam, dry heat and ethylene oxide sterilization of dental and medical devices in trays, and the like.

The liner having a riveted elastic securing band may be a removable, replaceable, flexible, disposable, durable, high temperature, plastic liner that may be disposed within a receptacle of a vessel, such as a cooking vessel, to cover the interior surfaces of the receptacle. The liner may be provided, for example, to form a barrier and keep food separate from the interior surface of the receptacle thereby preventing food contained within the cooking vessel from "baking-on" and/or "burning-on" the surfaces of the cooking vessel. Embodiments of the liner may also help improve food safety and quality, enhance flavor and juiciness of foods, minimize clean up time, and reduce shrinkage by allowing left over food to be removed from the slow cooker and saved in the liner for further use.

Heat sealing of the elastic to the liner using a plurality of spaced apart rivets improves the life and performance of the liner having an elastic securing mechanism in that a portion of the elastic between two adjacent rivets may fail and the remaining elastic will retain its elasticity. In one preferred embodiment, the plurality of spaced apart rivets are formed by burning a hole through the elastic material positioned between two pieces of liner material, wherein the two pieces of liner material are welding together through the through hole in the elastic to form the rivets. Other preferred embodiments include a cuff for encapsulating the elastic. This feature has particular advantages in food service application. By having the elastic riveted at multiple locations around a perimeter of the elastic, and also by enclosing the elastic in the liner cuff, there's basically no physical way for the elastic to contact or fall into the food.

In accordance with embodiments of the present invention, the liner with an elastic securing band incorporated around a perimeter of an open top end of the liner provides the following additional advantages and benefits:

- helps keep excess liner material proximate an upper portion of the liner secured and snuggly fit over the rim and around the outside of the slow cooker;
- provides a more aesthetically pleasing appearance, which may be desirable by, for example, caterers or fancy restaurants;
- prevents liner from falling into receptacle of vessel (e.g., during loading, stirring, serving, etc.);
- reduces manufacture costs as compared to other more expensive methods of lining vessels—e.g., using aluminum foil—due to less expensive materials and improved manufacturing techniques; and
- reduces clean up time and provides ease of cleaning.

Although the invention has been described with reference to exemplary embodiments, it is not limited thereto. Those skilled in the art will appreciate that numerous changes and modifications may be made to the preferred embodiments of the invention and that such changes and modifications may be made without departing from the true spirit of the invention. It is therefore intended that the appended claims cover be construed to all such equivalent variations as fall within the true spirit and scope of the invention.

What is claimed:

1. A liner to cover the interior surface of a vessel comprising:

a bag-like shaped liner body, the liner body comprising:

a closed bottom end;

one or more side walls extending upwardly from the closed bottom end;

an open top end;

an elastic securing band disposed around a perimeter of the liner proximate the open top end of the liner body;

a cuff formed proximate the open top end of the liner, wherein the elastic securing band is positioned within the cuff, wherein the cuff further comprises the liner material being folded over the elastic; and a plurality of spaced-apart rivets securing the elastic securing band to the liner, wherein the melting point of the liner is the same or higher than the melting point of the elastic securing band, wherein opposite sides of the liner forming the cuff are welded together to form the rivets through holes in the elastic securing band.

2. The liner of claim 1, wherein the melting point of the liner is higher than the melting point of the elastic securing band.

3. The liner of claim 1, wherein the opposite sides of the liner are welded together using ultrasonic sealing techniques.

4. The liner of claim 1, further comprising a cuff seal formed at the lower end of the cuff, wherein the cuff seal does not engage the elastic securing band.

5. The liner of claim 4, wherein the cuff seal comprises a continuous seal to encapsulate the elastic securing band in the cuff

6. The liner of claim 1, further comprising spaces between adjacent rivets, wherein the elastic securing band is not connected to the liner in the spaces.

7. The liner of claim 1, wherein the rivets are formed in a center portion of the elastic securing band and the rivets do not extend to edge portions of the elastic securing band, the edge portions of the elastic securing band are not connected to the liner.

8. The liner of claim 1, wherein the rivets have rounded corners.

9. The liner of claim 1, wherein the rivets are slanted and formed at an angle to an imaginary line extending transversely between opposite edges of the elastic securing band.

10. The liner of claim 1, wherein the liner material comprises one of: a nylon; a polyester; a polyester elastomer; a polyamide elastomer; or a polyolefin; and wherein the elastic securing band material comprises one of: a polyester elastomer; a polyamide elastomer; or a polyolefin elastomer.

11. The liner of claim 10, wherein the liner material comprises a blend of about 60% nylon 6 and about 40% heat stabilized nylon 66; and wherein the elastic securing band material comprises a polyester elastomer with a Shore D hardness of about 25-40.

12. The liner of claim 1, wherein the liner and elastic securing band can withstand cooking applications between about 100 degree F. and about 400 degree F.

13. The liner of claim 1, wherein the liner is suitable for high temperature applications over about 400 degree F.

14. A bag-shaped liner to cover the interior surface of a vessel comprising:

a closed bottom end;

an open top end;

one or more side walls extending upwardly from the closed bottom end to the open top end;

an elastic securing band disposed around a perimeter of the liner proximate the open top end;

a cuff formed proximate the open top end of the liner, wherein the elastic securing band is positioned within the cuff; and a plurality of spaced-apart rivets securing the elastic securing band to the liner, wherein the melting point of the liner is higher than the melting point of the elastic securing band, wherein opposite sides of the cuff are welded together to form the plurality of spaced-apart rivets through holes in the elastic securing band.

15. The bag-shaped liner of claim 14, wherein the cuff is formed by folding over the liner; and further comprising a cuff seal formed at the lower end of the cuff to encapsulate the elastic securing band in the cuff, wherein the cuff seal does not engage the elastic securing band.

16. The bag-shaped liner of claim 1, further comprising spaces between adjacent rivets, wherein the elastic securing band is not connected to the liner in the spaces between adjacent rivets;

wherein the rivets are formed in a center portion of the elastic securing band and the rivets do not extend to edge portions of the elastic securing band, the edge portions of the elastic securing band are not connected to the liner; and wherein the rivets are formed at an angle to an imaginary line extending transversely between opposite edges of the elastic securing band.

* * * * *

UNITED STATES PATENT AND TRADEMARK OFFICE

CERTIFICATE OF CORRECTION

PATENT NO. : 8,602,649 B2
APPLICATION NO. : 12/859963
DATED : December 10, 2013
INVENTOR(S) : Schmal et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 541 days.

Signed and Sealed this
Twenty-third Day of May, 2017

Michelle K. Lee
*Director of the United States Patent and Trademark Office*